(12) United States Patent
Nagai et al.

(10) Patent No.: US 10,168,803 B2
(45) Date of Patent: Jan. 1, 2019

(54) POINTING DEVICE AND TOUCH DETECTION SYSTEM

(71) Applicant: Japan Display Inc., Tokyo (JP)

(72) Inventors: Tatsunori Nagai, Tokyo (JP);
Masahiro Togashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 89 days.

(21) Appl. No.: 15/089,740

(22) Filed: Apr. 4, 2016

(65) Prior Publication Data

US 2016/0306497 A1 Oct. 20, 2016

(30) Foreign Application Priority Data

Apr. 17, 2015 (JP) ................. 2015-085379

(51) Int. Cl.
*G06F 3/0354* (2013.01)
*G06F 3/041* (2006.01)
*G06F 3/044* (2006.01)

(52) U.S. Cl.
CPC .......... *G06F 3/03545* (2013.01); *G06F 3/044* (2013.01); *G06F 3/0412* (2013.01); *G06F 3/0416* (2013.01)

(58) Field of Classification Search
None
See application file for complete search history.

(56) References Cited

U.S. PATENT DOCUMENTS 8,199,132 B1* 6/2012 Oda .................... G06F 3/03545
178/19.03
2014/0306929 A1* 10/2014 Huang ................ G06F 3/03545
345/174

FOREIGN PATENT DOCUMENTS

| JP | 2005190253 | 7/2005 |
| JP | 201191679 | 5/2011 |
| JP | 2014206933 | 10/2014 |

* cited by examiner

*Primary Examiner* — Duane N Taylor, Jr.
(74) *Attorney, Agent, or Firm* — K&L Gates LLP

(57) ABSTRACT

According to an aspect, a pointing device used to indicate a position on a touch detecting device includes: a first output unit provided to a body of the pointing device with which a hand of a user holding the pointing device comes into contact; and a first signal generating unit that generates a palm detection signal including a first code and different from a signal detected in a touch operation with the pointing device, and outputs the palm detection signal to the first output unit.

15 Claims, 16 Drawing Sheets

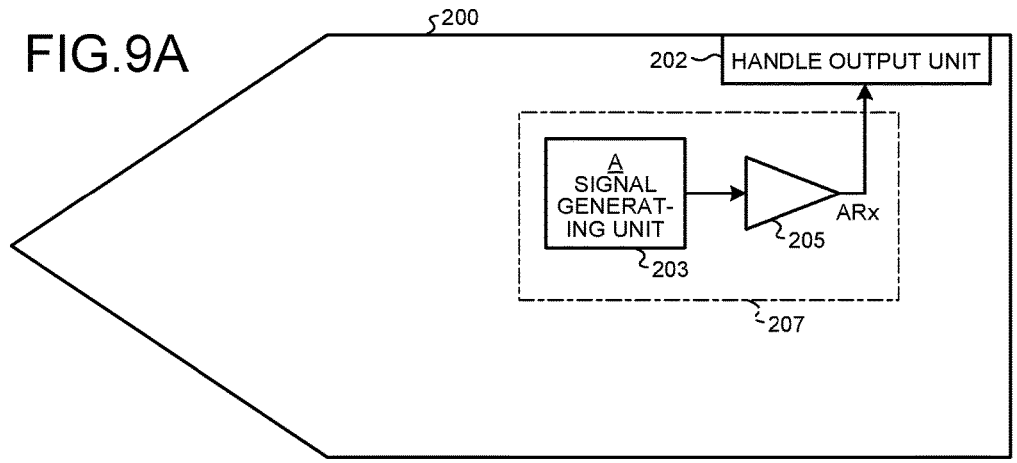
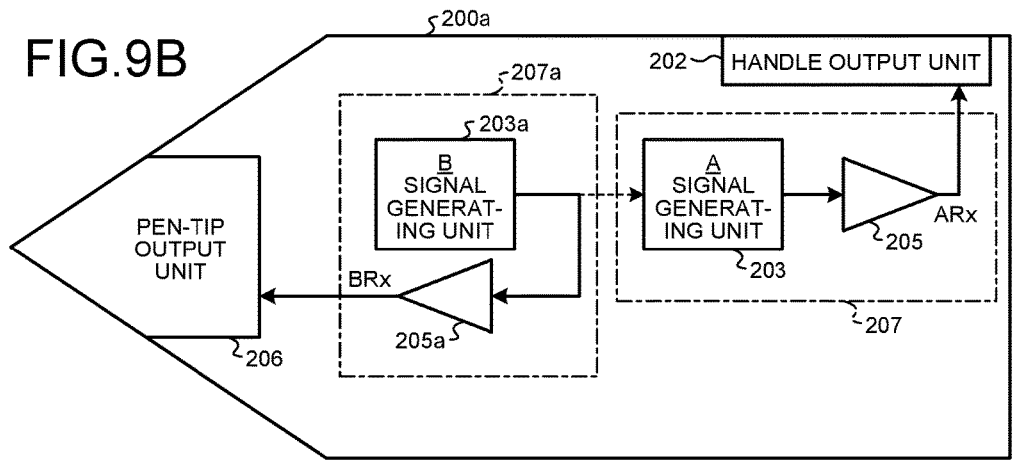
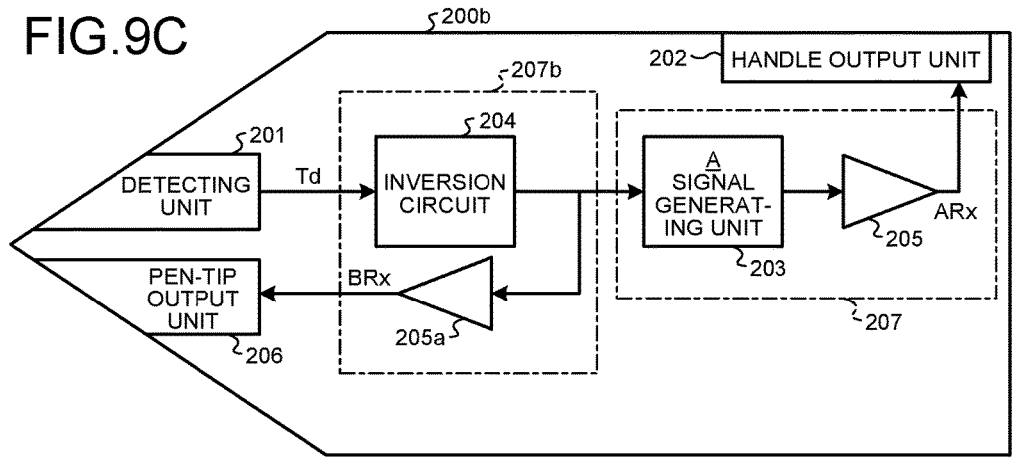

FIG.16

BASE LINE DATA Vb        ⌐800

| Vb1-1 | Vb1-2 | ... | ... | ... | ... | Vb1-n |
|-------|-------|-----|-----|-----|-----|-------|
| Vb2-1 | Vb2-2 | ... | ... | ... | ... | Vb2-n |
| ...   | ...   | ... | ... | ... | ... | ...   |
| ...   | ...   | ... | ... | ... | ... | ...   |
| ...   | ...   | ... | ... | ... | ... | ...   |
| ...   | ...   | ... | ... | ... | ... | ...   |
| Vbm-1 | Vbm-2 | ... | ... | ... | ... | Vbm-n |

FIG.17

DETECTION DATA Vd        ⌐800

| Vd1-1 | Vd1-2 | ... | ... | ... | ... | Vd1-n |
|-------|-------|-----|-----|-----|-----|-------|
| Vd2-1 | Vd2-2 | ... | ... | ... | ... | Vd2-n |
| ...   | ...   | ... | ... | ... | ... | ...   |
| ...   | ...   | ... | ... | ... | ... | ...   |
| ...   | ...   | ... | ... | ... | ... | ...   |
| ...   | ...   | ... | ... | ... | ... | ...   |
| Vdm-1 | Vdm-2 | ... | ... | ... | ... | Vdm-n |

FIG.20

CODE RECEPTION DATA D ⌐800

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 1 | 0 |
| 0 | 0 | 0 | 0 | 1 | 1 | 1 |
| 0 | 0 | 0 | 0 | 0 | 1 | 0 |
| 0 | 0 | 0 | 0 | 0 | 0 | 0 |

FIG.21

COORDINATE CALCULATION TARGET AREA ⌐800

| Vs1-1 | Vs1-2 | ... | ... | ... | ... | Vs1-n |
|---|---|---|---|---|---|---|
| Vs2-1 | Vs2-2 | ... | ... | ... | ... | Vs2-n |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |
| Vsm-1 | Vsm-2 | ... | ... | ... | ... | Vsm-n |

POINTING DEVICE AND TOUCH DETECTION SYSTEM

CROSS-REFERENCE TO RELATED APPLICATIONS

This application claims priority from Japanese Application No. 2015-085379, filed on Apr. 17, 2015, the contents of which are incorporated by reference herein in its entirety.

BACKGROUND

1. Technical Field

The present invention relates to a pointing device and a touch detection system.

2. Description of the Related Art

Display apparatuses with a touch detection function have recently been attracting attention. Such display apparatuses are obtained by mounting a contact detecting device called a touch panel on a display device, such as a liquid-crystal display device, or integrating the touch panel with the display device. The display apparatuses display various button images and other images on the display device instead of typical mechanical buttons to receive information. Because the display apparatuses with a touch panel require no input device, such as a keyboard, a mouse, or a keypad, they are increasingly used for computers, portable electronic apparatuses, such as mobile phones, and other equipment.

Some types of touch detection technologies are known, including capacitive touch panels that require low power consumption. Display apparatuses with a touch detection function including such a capacitive touch panel, for example, may have the following configuration: common electrodes for display originally included in the display apparatuses are also used as one of a pair of touch sensor electrodes, and the other of the electrodes (touch detection electrode) is arranged in a manner intersecting with the common electrodes. The display apparatuses with a touch detection function sequentially apply a drive signal to the common electrodes to perform linear sequential scanning, thereby performing a display operation. In addition, the display apparatuses with a touch detection function analyze a touch detection signal generated in the touch detection electrode in response to the drive signal based on the fact that capacitance formed between the pair of touch sensor electrodes changes depending on an external proximity object, thereby performing a touch detection operation.

In touch detection systems with such a touch panel, a user may perform a touch operation using the finger or a pointing device, such as a stylus pen (an active pen or an electronic pen). Japanese Patent Application Laid-open Publication No. 2014-206933 (JP-A-2014-206933) discloses a touch panel controller capable of determining that a touch is made by the hand of a user when the perimeter of a region in which the touch is detected is equal to or larger than a threshold. When the user performs a touch operation with the pointing device held in the hand, the following case may possibly occur: if the hand of the user holding the pointing device comes into contact with the touch panel, the touch is detected at a position unintended by the user, that is, a position where the hand of the user comes into contact with the touch panel. To address this, JP-A-2014-206933 also describes what is called a palm rejection function to exclude a touch operation when it is determined to be a touch operation performed by the hand of the user.

When the conventional technology described above determines an operation to be a touch operation performed by the hand of the user, however, the region in which a touch is detected is not necessarily made by the hand holding the pointing device. To transmit the fact that the user is performing the touch operation with the pointing device held in the hand, a wireless communication function, such as Bluetooth (registered trademark) may be used. In this case, the pointing device needs to have a wireless communication function other than the touch operation.

For the foregoing reasons, there is a need for a pointing device and a touch detection system that can exclude a touch operation performed by a hand holding a pointing device simply by the touch operation.

SUMMARY

According to an aspect, a pointing device used to indicate a position on a touch detecting device includes: a first output unit provided to a body of the pointing device with which a hand of a user holding the pointing device comes into contact; and a first signal generating unit that generates a palm detection signal including a first code and different from a signal detected in a touch operation with the pointing device, and outputs the palm detection signal to the first output unit.

According to another aspect, a touch detection system includes: the pointing device; a touch detecting device including a plurality of first electrodes provided side by side in a manner extending in one direction and a plurality of second electrodes provided side by side in a manner extending in a direction intersecting with the first electrodes, the touch detecting device forming capacitance between the first electrodes and the second electrodes; a code identifying unit that identifies the first code included in a detection signal detected at each of intersections between the first electrodes and the second electrodes; and a touch detecting unit that detects a touch state indicating that the pointing device or the hand of the user is in proximity to or in contact with the touch detecting device based on the detection signal and calculates a coordinate position indicated by the pointing device based on the touch state at each of the intersections and based on output from the code identifying unit.

BRIEF DESCRIPTION OF THE DRAWINGS

FIGS. 9A to 9C are diagrams of an exemplary configuration of pointing devices according to the first embodiment;

FIG. 16 is an exemplary distribution chart of base line data Vb in a touch detection region;

FIG. 17 is an exemplary distribution chart of detection data Vd in the touch detection region;

FIG. 20 is an exemplary distribution chart of code reception data D in the touch detection region;

FIG. 21 is an exemplary distribution chart of a coordinate calculation target area in the touch detection region.

DETAILED DESCRIPTION

Figure 1A:
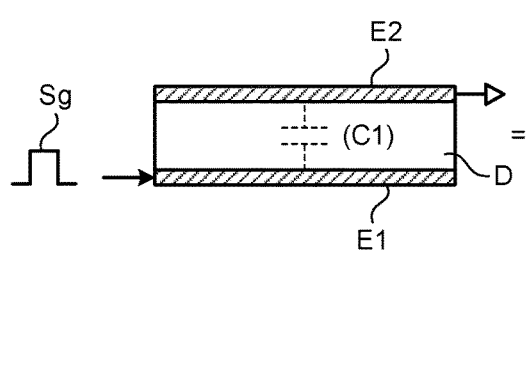
FIGS. 1A and 1B are diagrams for explaining the basic principle of a touch detection technology employed by a touch detection system according to a first embodiment and illustrate a state where no finger or no pointing device is in contact with or in proximity to a touch sensor.

Exemplary embodiments according to the present invention are described below in greater detail with reference to the accompanying drawings. The contents described in the embodiments are not intended to limit the present invention. Components described below include components easily conceivable by those skilled in the art and components substantially identical therewith. Furthermore, the components described below can be appropriately combined. The disclosure is given by way of example only, and various changes made without departing from the spirit of the invention and easily conceivable by those skilled in the art naturally fall within the scope of the invention. The drawings may possibly illustrate the width, the thickness, the shape, and other elements of each unit more schematically than the actual aspect to simplify the explanation. These elements, however, are given by way of example only and are not intended to limit interpretation of the invention. In the specification and the accompanying drawings, components similar to those previously described with reference to a preceding drawing are denoted by the same reference numerals and symbols, and overlapping explanation thereof will be appropriately omitted.

First Embodiment

Figure 1B:
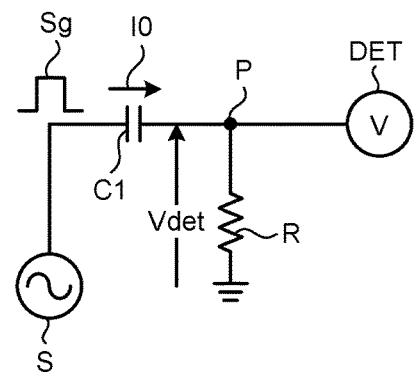
Figure 2A:
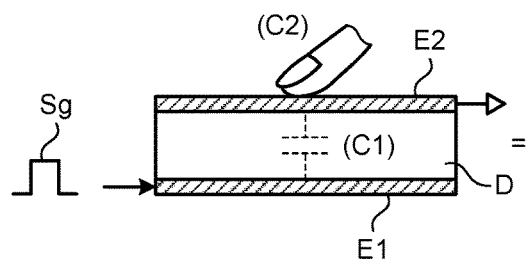
FIGS. 2A and 2B are diagrams for explaining the basic principle of the touch detection technology employed by the touch detection system according to the first embodiment and illustrate a state where a finger is in contact with or in proximity to the touch sensor.
Figure 2B:
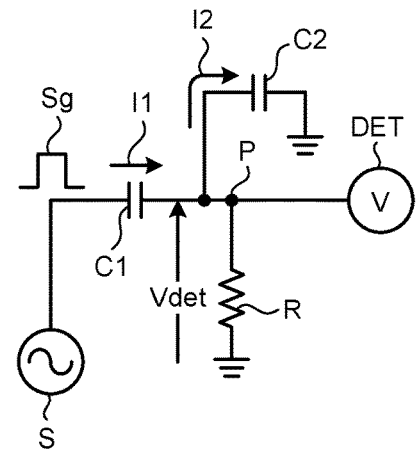
Figure 3A:
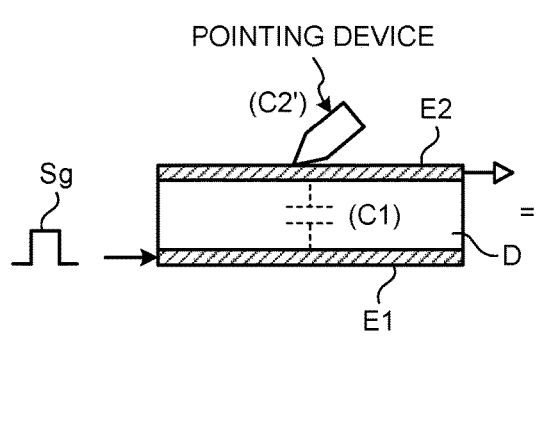
FIGS. 3A and 3B are diagrams for explaining the basic principle of the touch detection technology employed by the touch detection system according to the first embodiment and illustrate a state where a typical pointing device is in contact with or in proximity to the touch sensor.
Figure 3B:
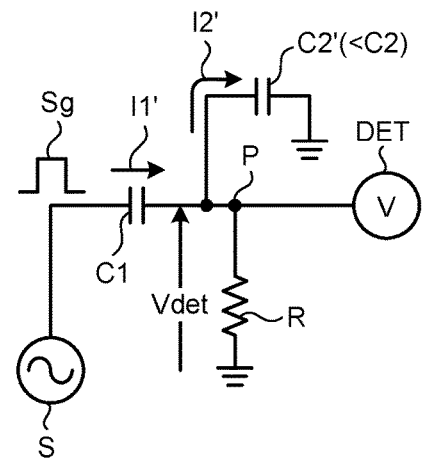
Figure 4:
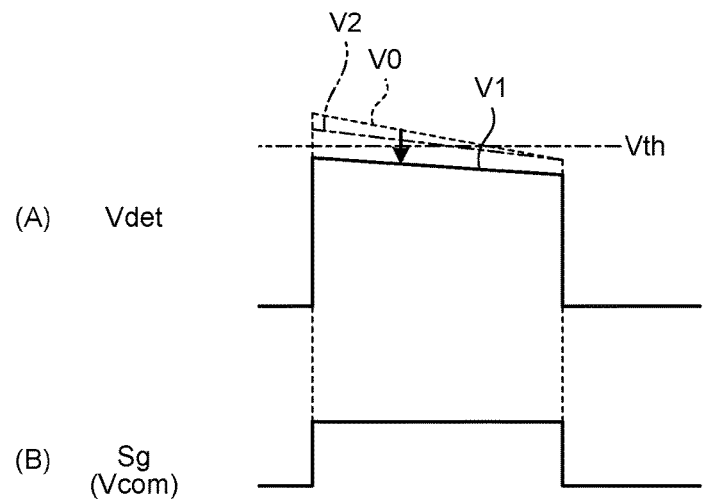
FIG. 4 is a diagram for explaining the basic principle of the touch detection technology employed by the touch detection system according to the first embodiment and illustrates an example of waveforms of a drive signal and a touch detection signal.

The following describes the basic principle of touch detection performed by a touch detection system according to a first embodiment with reference to FIGS. 1A, 1B, 2A, 2B, 3A, 3B, and 4. FIGS. 1A and 1B are diagrams for explaining the basic principle of the touch detection technology employed by the touch detection system according to the first embodiment and illustrate a state where no finger or no pointing device is in contact with or in proximity to a touch sensor. FIGS. 2A and 2B are diagrams for explaining the basic principle of the touch detection technology employed by the touch detection system according to the first embodiment and illustrate a state where a finger is in contact with or in proximity to the touch sensor. FIGS. 3A and 3B are diagrams for explaining the basic principle of the touch detection technology employed by the touch detection system according to the first embodiment and illustrate a state where a typical pointing device is in contact with or in proximity to the touch sensor. FIG. 4 is a diagram for explaining the basic principle of the touch detection technology employed by the touch detection system according to the first embodiment and illustrates an example of waveforms of a drive signal and a touch detection signal.

The touch detection technology employed by the touch detection system according to the first embodiment is embodied as a capacitive touch sensor. As illustrated in FIG. 1A, for example, a capacitive element includes a pair of electrodes (a drive electrode E1 and a touch detection electrode E2) arranged facing each other with a dielectric D interposed therebetween. This structure is represented by an equivalent circuit in FIG. 1B. A capacitive element C1 includes the drive electrode E1, the touch detection electrode E2, and the dielectric D. A first end of the capacitive element C1 is coupled to an alternating-current (AC) signal source (drive signal source) S, whereas a second end P thereof is grounded via a resistor R and coupled to a voltage detector (touch detection circuit) DET. When the AC signal source S applies an AC rectangular wave Sg ((B) of FIG. 4) at a predetermined frequency (e.g., approximately several kilohertz to ten-odd kilohertz) to the drive electrode E1 (first end of the capacitive element C1), an output waveform (touch detection signal Vdet) of (A) illustrated in FIG. 4 is generated in the touch detection electrode E2 (second end P of the capacitive element C1). The AC rectangular wave Sg corresponds to a drive signal Vcom, which will be described later. The touch detection technology according to the first embodiment is what is called a mutual-type touch detection technology for detecting position coordinates of a detection target based on a change in the capacitance between the drive electrode E1 and the touch detection electrode E2.

In a state where a finger or a pointing device, such as a stylus pen and an active pen, is not in contact with (or in proximity to) the touch sensor (hereinafter, also referred to as a "non-touch state"), an electric current I0 depending on the capacitance value of the capacitive element C1 flows with charge and discharge of the capacitive element C1 as illustrated in FIG. 1B. The potential waveform at the second end P of the capacitive element C1 at this time is indicated by a waveform V0 of (A) in FIG. 4, for example, and is detected by the voltage detector DET.

In a state where a finger is in contact with (or in proximity to) the touch sensor (hereinafter, also referred to as a "touch state" created by a finger), a capacitive element C2 generated by the finger is added in series to the capacitive element C1 as illustrated in FIG. 2B. In this state, electric currents I1 and I2 flow with charge and discharge of the capacitive elements C1 and C2, respectively. The potential waveform at the second end P of the capacitive element C1 at this time is indicated by a waveform V1 of (A) in FIG. 4, for example, and is detected by the voltage detector DET. The electric potential at the point P is a voltage-divided potential determined based on the electric currents I1 and I2 flowing through the capacitive elements C1 and C2, respectively. As a result, the waveform V1 has a value smaller than that of the waveform V0 in the non-contact state. The voltage detector DET compares the detected voltage with a predetermined threshold voltage Vth. If the detected voltage is equal to or higher than the threshold voltage Vth, the voltage detector DET determines that the touch sensor is in the non-touch state. By contrast, if the detected voltage is lower than the threshold voltage, the voltage detector DET determines that the touch sensor is in the touch state. With this operation, the voltage detector DET can detect a touch.

By contrast, in a state where a pointing device, such as a stylus pen and an active pen, having a small contact area is in contact with (or in proximity to) the touch sensor (hereinafter, also referred to as a "touch state" created by a pointing device), a capacitive element C2' generated by the pointing device is added in series to the capacitive element C1 as illustrated in FIG. 3B. In this state, electric currents I1' and I2' flow with charge and discharge of the capacitive elements C1 and C2', respectively. The potential waveform at the second end P of the capacitive element C1 at this time is indicated by a waveform V2 of (A) in FIG. 4, for example, and is detected by the voltage detector DET. The electric potential at the point P is a voltage-divided potential determined based on the electric currents I1' and I2' flowing through the capacitive elements C1 and C2', respectively. The capacitive value of the capacitive element C2' generated in the touch state created by the pointing device is smaller than that of the capacitive element C2 generated in the touch state created by the finger (C2'<C2). As a result, the waveform V2 has a value smaller than that of the waveform V0 in the non-touch state and larger than that of the waveform V1 in the touch state created by the finger. In other words, the difference between the waveform V2 in the touch state created by the pointing device and the waveform V0 in the non-touch state is smaller than that between the waveform V1 in the touch state created by the finger and the waveform V0 in the non-touch state. When the voltage detector DET compares the detected voltage with the threshold voltage Vth, the detected voltage may possibly be equal to or higher than the threshold voltage of (A) as illustrated in FIG. 4. As a result, the voltage detector DET may possibly erroneously determine that the touch sensor is in the non-touch state.

To improve the accuracy in detection of the touch state created by the pointing device, the pointing device preferably detects the AC rectangular wave Sg applied from the AC signal source S to the drive electrode E1, inverts and amplifies the AC rectangular wave Sg, outputs it, and superimposes the output AC rectangular wave Sg on the detection electrode E2, for example. This configuration reduces the voltage-divided potential at the point P determined based on the values of the electric currents I1' and I2' flowing through the capacitive elements C1 and C2', respectively. It is thus possible to increase the difference between the waveform V2 in the touch state created by the pointing device and the waveform V0 in the non-touch state. In other words, the inverting amplification factor of the received AC rectangular wave Sg is set such that the voltage detected by the voltage detector DET is lower than the threshold voltage when the voltage detector DET compares the detected voltage with the threshold voltage Vth. This operation can improve the accuracy in detection of the touch state created by the pointing device.

Figure 5:
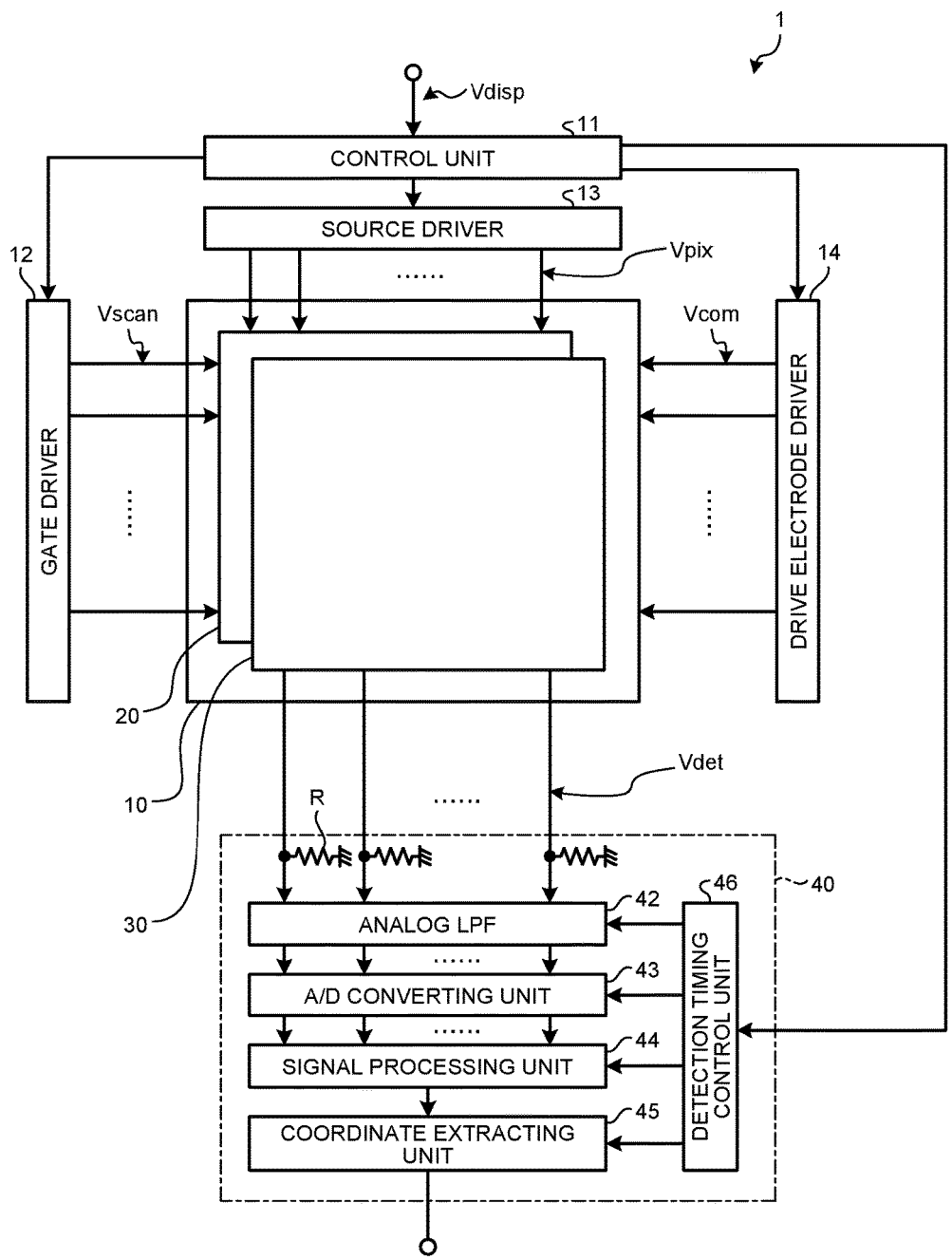
FIG. 5 is a diagram of an exemplary configuration of a display apparatus with a touch detection function in the touch detection system according to the first embodiment.

FIG. 5 is a diagram of an exemplary configuration of a display apparatus with a touch detection function in the touch detection system according to the first embodiment. Because a drive circuit and a driving method of a display apparatus 1 with a touch detection function are embodied by the present embodiment, they will also be explained. The display apparatus 1 with a touch detection function includes liquid-crystal display elements as display elements. The display apparatus 1 with a touch detection function is what is called an in-cell apparatus in which a liquid-crystal display device including the liquid-crystal display elements is integrated with a capacitive touch detecting device.

The display apparatus 1 with a touch detection function includes a control unit 11, a gate driver 12, a source driver 13, a drive electrode driver 14, a display device 10 with a touch detection function, and a touch detection circuit 40.

The control unit 11 is a circuit that supplies control signals to the gate driver 12, the source driver 13, the drive electrode driver 14, and the touch detection circuit 40 based on video signals Vdisp supplied from the outside, thereby performing control such that these components operate in synchronization with one another.

The gate driver 12 has a function to sequentially select one horizontal line to be a target of display drive in the display device 10 with a touch detection function based on the control signal supplied from the control unit 11. Specifically, the gate driver 12 applies a scanning signal Vscan to gates of TFT elements Tr of pixels Pix via a scanning signal line GCL, which will be described later. The gate driver 12 thus sequentially selects one row (one horizontal line) out of the pixels Pix arranged in a matrix on a liquid-crystal display device 20 of the display device 10 with a touch detection function as a target of display drive.

The source driver 13 is a circuit that supplies pixel signals Vpix to the pixels Pix (described later) of the display device 10 with a touch detection function based on the control signal supplied from the control unit 11. Specifically, the source driver 13 applies, via pixel signal lines SGL, the pixel signals Vpix to the pixels Pix constituting one horizontal line sequentially selected by the gate driver 12, which will be described later. Based on the supplied pixel signals Vpix, the pixels Pix perform display of one horizontal line.

The drive electrode driver 14 is a circuit that supplies a drive signal Vcom to drive electrodes COML (described later) of the display device 10 with a touch detection function based on the control signal supplied from the control unit 11. Specifically, the drive electrode driver 14 drives each drive electrode COML. To perform a display operation, the drive electrode driver 14 supplies a display drive signal Vcomd. By contrast, to perform a touch detection operation, the drive electrode driver 14 supplies a touch detection drive signal Vcomt. In the touch detection operation, the drive electrode driver 14 sequentially applies the touch detection drive signal Vcomt to a plurality of drive electrodes COML in a time-division manner, thereby sequentially selecting the drive electrode COML to perform the touch detection operation. A touch detecting device 30 outputs a touch detection signal Vdet of each drive electrode COML from a plurality of touch detection electrodes TDL (described later) and supplies it to the touch detection circuit 40.

The display device 10 with a touch detection function is a display device having a touch detection function. The display device 10 with a touch detection function includes the liquid-crystal display device 20 and the touch detecting device 30. The liquid-crystal display device 20 sequentially scans one horizontal line based on a gate signal supplied from the gate driver 12, thereby performing display, which will be described later. The touch detecting device 30 operates based on the basic principle of capacitive touch detection described above, thereby outputting the touch detection signal Vdet. The touch detecting device 30 sequentially scans each drive electrode COML based on the drive signal Vcom output from the drive electrode driver 14, thereby performing touch detection, which will be described later.

The touch detection circuit 40 detects whether a touch is made on the touch detecting device 30 based on the control signal supplied from the control unit 11 and the touch detection signal Vdet supplied from the touch detecting device 30 of the display device 10 with a touch detection function. If a touch is made, the touch detection circuit 40 obtains the coordinates and the like in a touch detection region. The touch detection circuit 40 includes an analog low-pass filter (LPF) 42, an analog/digital (A/D) converting unit 43, a signal processing unit 44, a coordinate extracting unit 45, and a detection timing control unit 46. The analog LPF 42 is a low-pass analog filter that removes high-frequency components (noise components) included in the touch detection signal Vdet supplied from the touch detecting device 30 and extracts and outputs a touch component. Resistances R are coupled between respective input terminals of the analog LPF 42 and the ground to supply a direct-current (DC) potential (0 V). The DC potential (0 V) may be supplied by providing a switch instead of the resistances R, for example, and turning on the switch at predetermined time. The A/D converting unit 43 is a circuit that converts an analog signal output from the analog LPF 42 into a digital signal. The signal processing unit 44 is a logic circuit that detects whether a touch is made on the touch detecting device 30 based on the output signal from the A/D converting unit 43. The coordinate extracting unit 45 is a logic circuit that derives, when a touch is detected by the signal processing unit 44, the coordinate position of the touch. The detection timing control unit 46 performs control such that these circuits operate in synchronization with one another. The touch detection circuit 40 outputs the coordinate position extracted by the coordinate extracting unit 45 as touch detection positional information. The operations of the signal processing unit 44 and the coordinate extracting unit 45 will be described later in greater detail.

Figure 6:
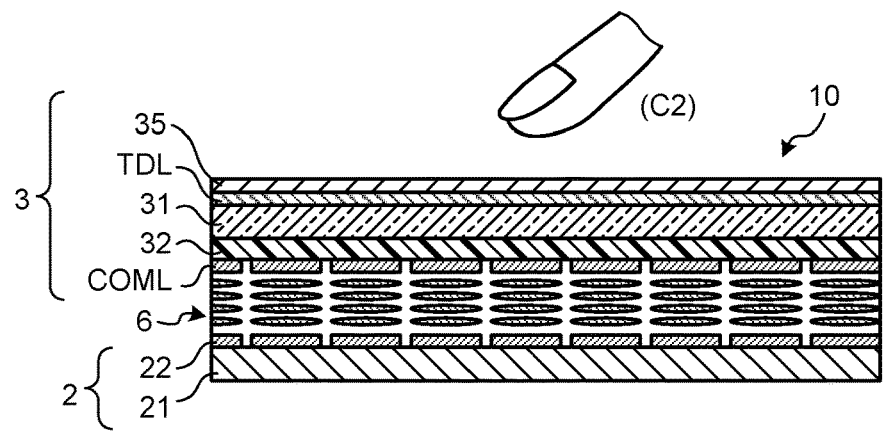
FIG. 6 is a schematic view of an exemplary sectional structure of a major part of a display device with a touch detection function.

The following describes an exemplary configuration of the display device 10 with a touch detection function in detail. FIG. 6 is a schematic view of an exemplary sectional structure of a major part of the display device 10 with a touch detection function. The display device 10 with a touch detection function includes a pixel substrate 2, a counter substrate 3, and a liquid-crystal layer 6. The counter substrate 3 is arranged facing the pixel substrate 2. The liquid-crystal layer 6 is inserted between the pixel substrate 2 and the counter substrate 3.

The pixel substrate 2 includes a TFT substrate 21 serving as a circuit board and a plurality of pixel electrodes 22 arranged in a matrix on the TFT substrate 21. The TFT substrate 21 is provided with thin-film transistors (TFTs) of the respective pixels and wiring, such as the pixel signal lines SGL and the scanning signal lines GCL, which are not illustrated. The pixel signal lines SGL supply the pixel signals Vpix to the pixel electrodes 22, and the scanning signal lines GCL drive the TFTs.

The counter substrate 3 includes a glass substrate 31, a color filter 32 formed on one surface of the glass substrate 31, and a plurality of drive electrodes COML formed on the color filter 32. The color filter 32 includes periodically arrayed color filter layers of three colors of red (R), green (G), and blue (B), for example. The color filter layer of the three colors of R, G, and B is provided to each display pixel as a set. The drive electrodes COML function not only as common drive electrodes of the liquid-crystal display device 20 but also as drive electrodes of the touch detecting device 30. The drive electrodes COML are coupled to the TFT substrate 21 by a contact conductive pillar, which is not illustrated. The TFT substrate 21 applies the drive signal Vcom (the display drive signal Vcomd and the touch detection drive signal Vcomt) having an AC rectangular waveform to the drive electrodes COML via the contact conductive pillar. While one drive electrode COML corresponds to one pixel electrode 22 in FIG. 6, the configuration is not limited thereto. Alternatively, one drive electrode COML may correspond to two pixel electrodes 22 or three or more pixel electrodes 22. The touch detection electrodes TDL serving as detection electrodes of the touch detecting device 30 are formed on the other surface of the glass substrate 31. A polarization plate 35 is provided on the touch detection electrodes TDL.

The liquid-crystal layer 6 modulates light passing therethrough depending on the state of an electric field. Examples of the liquid-crystal layer 6 include liquid crystals in various types of modes, such as a twisted nematic (TN) mode, a vertical alignment (VA) mode, and an electrically controlled birefringence (ECB) mode.

An orientation film is provided between the liquid-crystal layer 6 and the pixel substrate 2 and between the liquid-crystal layer 6 and the counter substrate 3. An incident-side polarization plate is arranged on the lower surface of the pixel substrate 2. The orientation film and the incident-side polarization plate are not illustrated in FIG. 6.

Figure 7:
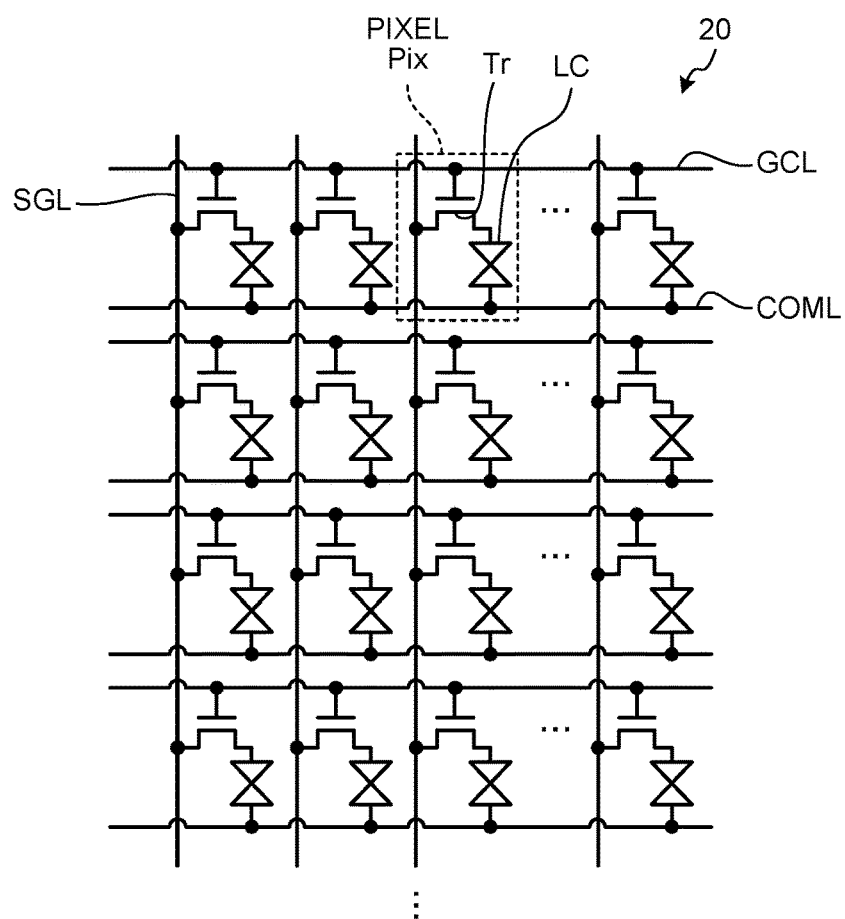
FIG. 7 is a diagram of an exemplary configuration of a pixel structure in a liquid-crystal display device.

FIG. 7 is a diagram of an exemplary configuration of the pixel structure in the liquid-crystal display device 20. The liquid-crystal display device 20 includes a plurality of pixels Pix arranged in a matrix. The pixels Pix each include the TFT element Tr and a liquid-crystal element LC. The TFT element Tr is a thin-film transistor and is an re-channel metal oxide semiconductor (MOS) TFT in this example. The source of the TFT element Tr is coupled to the pixel signal line SGL, the gate thereof is coupled to the scanning signal line GCL, and the drain thereof is coupled to a first end of the liquid-crystal element LC. The first end of the liquid-crystal element LC is coupled to the drain of the TFT element Tr, and a second end thereof is coupled to the drive electrode COML.

The pixel Pix is coupled to other pixels Pix belonging to the same row in the liquid-crystal display device 20 by the scanning signal line GCL. The scanning signal line GCL is coupled to the gate driver 12 and is supplied with the scanning signal Vscan from the gate driver 12. The pixel Pix is also coupled to other sub-pixels Pix belonging to the same column in the liquid-crystal display device 20 by the pixel signal line SGL. The pixel signal line SGL is coupled to the source driver 13 and is supplied with the pixel signal Vpix from the source driver 13.

The pixel Pix is also coupled to the other pixels Pix belonging to the same row in the liquid-crystal display device 20 by the drive electrode COML. The drive electrode COML is coupled to the drive electrode driver 14 and is supplied with the drive signal Vcom (the display drive signal Vcomd or the touch detection drive signal Vcomt) from the drive electrode driver 14. In other words, one drive electrode COML is shared by a plurality of pixels Pix belonging to the same row in this example. Alternatively, one drive electrode COML may be shared by a plurality of pixels Pix belonging to a plurality of rows (two rows, for example).

With this configuration, the gate driver 12 sequentially drives to scan the scanning signal lines GCL in the liquid-crystal display device 20 in a time-division manner, thereby sequentially selecting one horizontal line. The source driver 13 supplies the pixel signals Vpix to the pixels Pix belonging to the horizontal line, thereby performing display of the horizontal lines one by one. In the display operation, the drive electrode driver 14 applies the display drive signal Vcomd to the drive electrode COML corresponding to the horizontal line.

Figure 8:
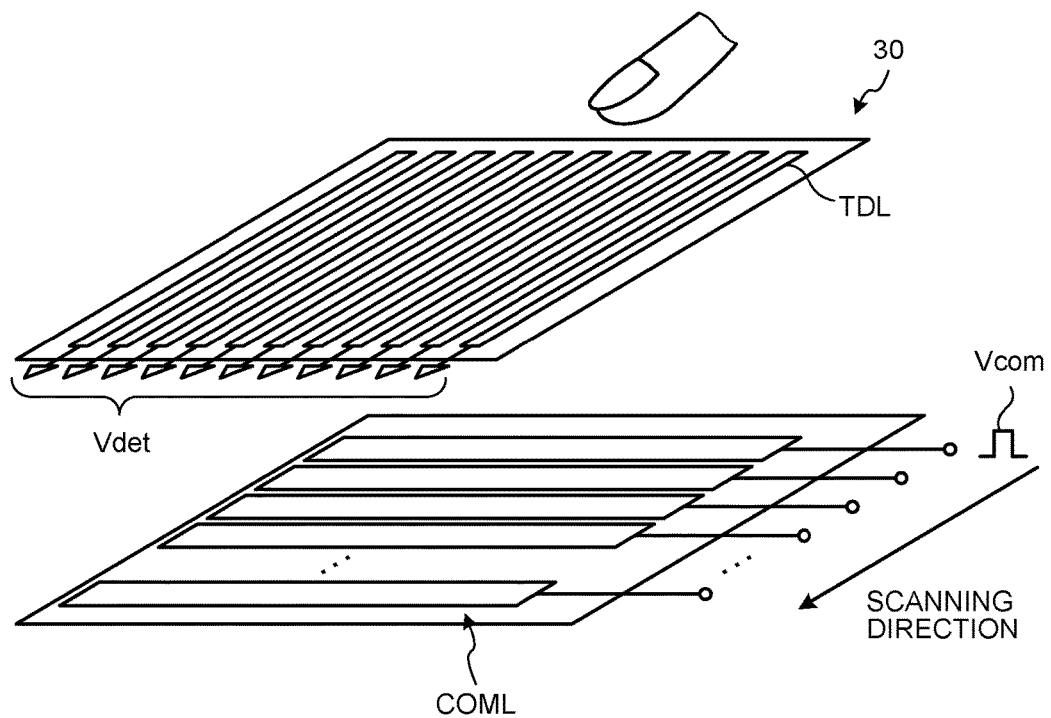
FIG. 8 is a perspective view of an exemplary configuration of a touch detecting device.

FIG. 8 is a perspective view of an exemplary configuration of the touch detecting device 30. The touch detecting device 30 includes the drive electrodes COML and the touch detection electrodes TDL included in the counter substrate 3. The drive electrodes COML are a plurality of stripe electrode patterns extending in the lateral direction in FIG. 8. In a touch detection operation, the drive electrode driver 14 sequentially supplies the touch detection drive signal Vcomt to the electrode patterns, thereby performing sequential linear scanning drive. The touch detection electrodes TDL are stripe electrode patterns extending in a direction orthogonal to the extending direction of the electrode patterns of the drive electrodes COML. The electrode patterns of the touch detection electrodes TDL are coupled to respective input terminals of the analog LPF 42 of the touch detection circuit 40. The electrode patterns of the drive electrodes COML and the touch detection electrodes TDL intersecting with each other have capacitance at the intersections.

In a touch detection operation, the drive electrode driver 14 drives to perform sequential linear scanning, thereby sequentially selecting the drive electrode COML in the touch detecting device 30. The touch detection electrodes TDL output the touch detection signal Vdet, thereby performing touch detection for each drive electrode COML in the touch detecting device 30. In other words, the drive electrodes COML correspond to the drive electrode E1 in the basic principle of touch detection illustrated in FIGS. 1A, 1B, 2A, 2B, 3A, 3B, and 4, whereas the touch detection electrodes TDL correspond to the touch detection electrode E2 in the basic principle of touch detection illustrated in FIGS. 1A, 1B, 2A, 2B, 3A, 3B, and 4. The touch detecting device 30 detects a touch according to the basic principle. As illustrated in FIG. 8, the electrode patterns intersecting with each other serve as a capacitive touch sensor formed in a matrix. By scanning the entire touch detection surface of the touch detecting device 30, it is possible to detect the position at which an external proximity object is in contact with or in proximity to the touch detecting device 30.

Figure 10A:
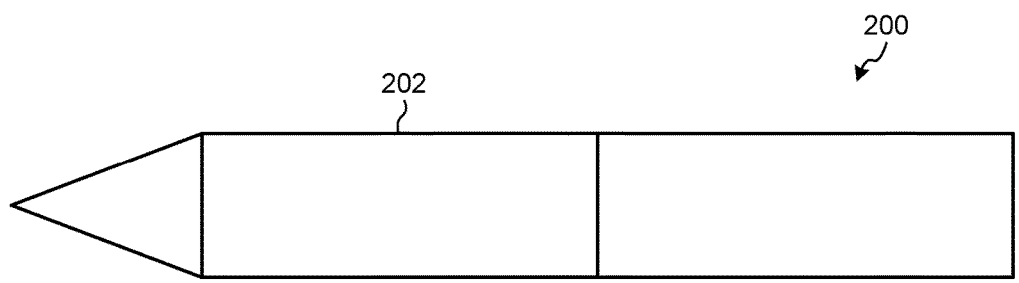
FIGS. 10A to 10C are schematic views of an outer shape of the pointing devices according to the first embodiment.
Figure 10B:
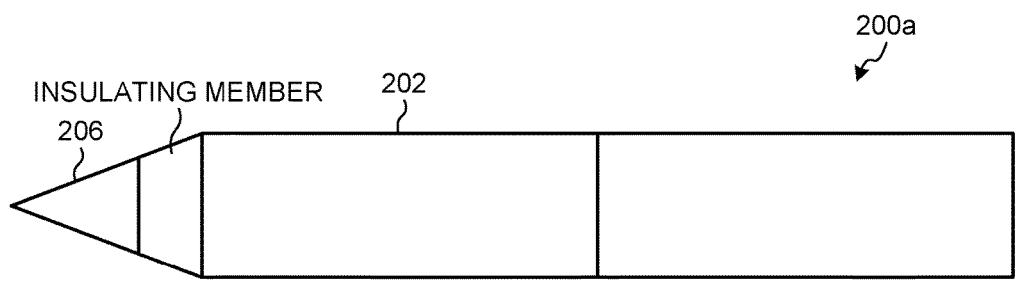
Figure 10C:
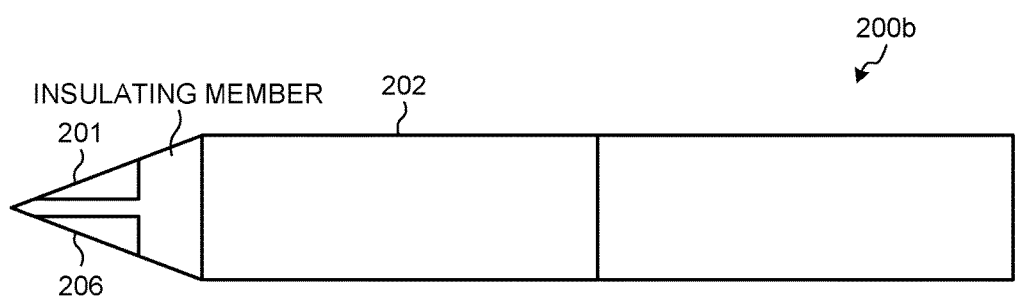

The following describes the pointing device according to the present embodiment. FIGS. 9A to 9C are diagrams of an exemplary configuration of the pointing devices according to the first embodiment. FIGS. 10A to 10C are schematic views of an outer shape of the pointing devices according to the first embodiment.

A pointing device 200 illustrated in FIG. 9A includes a handle output unit (first output unit) 202, a signal generating unit (first signal generating unit) 203, and an amplification circuit 205. In the configuration illustrated in FIG. 9A, the signal generating unit 203 and the amplification circuit 205 serve as a signal generation unit 207.

As illustrated in FIG. 10A, the handle output unit 202 is provided to the body of the pointing device 200 with which the hand of the user comes into contact when he/she performs a touch operation.

The signal generating unit 203 holds a code A (first code) in advance. The signal generating unit 203 generates a pulse signal including the code A and outputs it to the amplification circuit 205. The amplification circuit 205 amplifies the pulse signal including the code A output from the signal generating unit 203 to generate a palm detection signal ARx and outputs the palm detection signal ARx to the handle output unit 202.

A pointing device 200a illustrated in FIG. 9B includes a signal generating unit (second signal generating unit) 203a, an amplification circuit 205a, and a pen-tip output unit (second output unit) 206 besides the components of the pointing device 200 illustrated in FIG. 9A. In the configuration illustrated in FIG. 9B, the signal generating unit 203a and the amplification circuit 205a serve as a signal generation unit 207a.

As illustrated in FIG. 10B, the pen-tip output unit 206 is provided to the pen tip of the pointing device 200a that comes closer to or into contact with the display device 10 with a touch detection function when the user performs a touch operation. The handle output unit 202 and the pen-tip output unit 206 are insulated from each other by an insulating member.

The signal generating unit 203a holds a code B (second code) different from the code A in advance. The signal generating unit 203a generates a pulse signal including the code B and outputs it to the amplification circuit 205a. The amplification circuit 205a amplifies the pulse signal including the code B output from the signal generating unit 203a to generate a position detection auxiliary signal BRx and outputs the position detection auxiliary signal BRx to the pen-tip output unit 206.

The signal generating unit 203 may receive the pulse signal output from the signal generating unit 203a and output the palm detection signal ARx including the code A and the code B to the handle output unit 202.

A pointing device 200b illustrated in FIG. 9C includes an inversion circuit 204 instead of the signal generating unit 203a, and a detecting unit 201 besides the components of the pointing device 200a illustrated in FIG. 9B. In the configuration illustrated in FIG. 9C, the inversion circuit 204 and the amplification circuit 205a serve as a signal generation unit 207b.

As illustrated in FIG. 10C, the detecting unit 201 is provided, similarly to the pen-tip output unit 206, to the pen tip of the pointing device 200b that comes closer to or into contact with the display device 10 with a touch detection function when the user performs a touch operation. The detecting unit 201, the handle output unit 202, and the pen-tip output unit 206 are insulated from one another by an insulating member.

The detecting unit 201 detects potential fluctuation in a transmission signal Tx applied to a transmission electrode, which will be described later, and outputs it in the form of detection transmission signal Td to the inversion circuit 204.

The inversion circuit 204 inverts the detection transmission signal Td received from the detecting unit 201 and outputs it to the amplification circuit 205a. The amplification circuit 205a amplifies the inverted signal of the detection transmission signal Td output from the inversion circuit 204 to generate a position detection auxiliary signal BRx and outputs the position detection auxiliary signal BRx to the pen-tip output unit 206.

The signal generating unit 203 receives the inverted signal of the detection transmission signal Td output from the inversion circuit 204. The signal generating unit 203 generates a pulse signal by adding the code A to the inverted signal of the detection transmission signal Td and outputs the pulse signal to the amplification circuit 205. The amplification circuit 205 amplifies the pulse signal including the code A output from the signal generating unit 203 to generate a palm detection signal ARx and outputs the palm detection signal ARx to the handle output unit 202.

Figure 11:
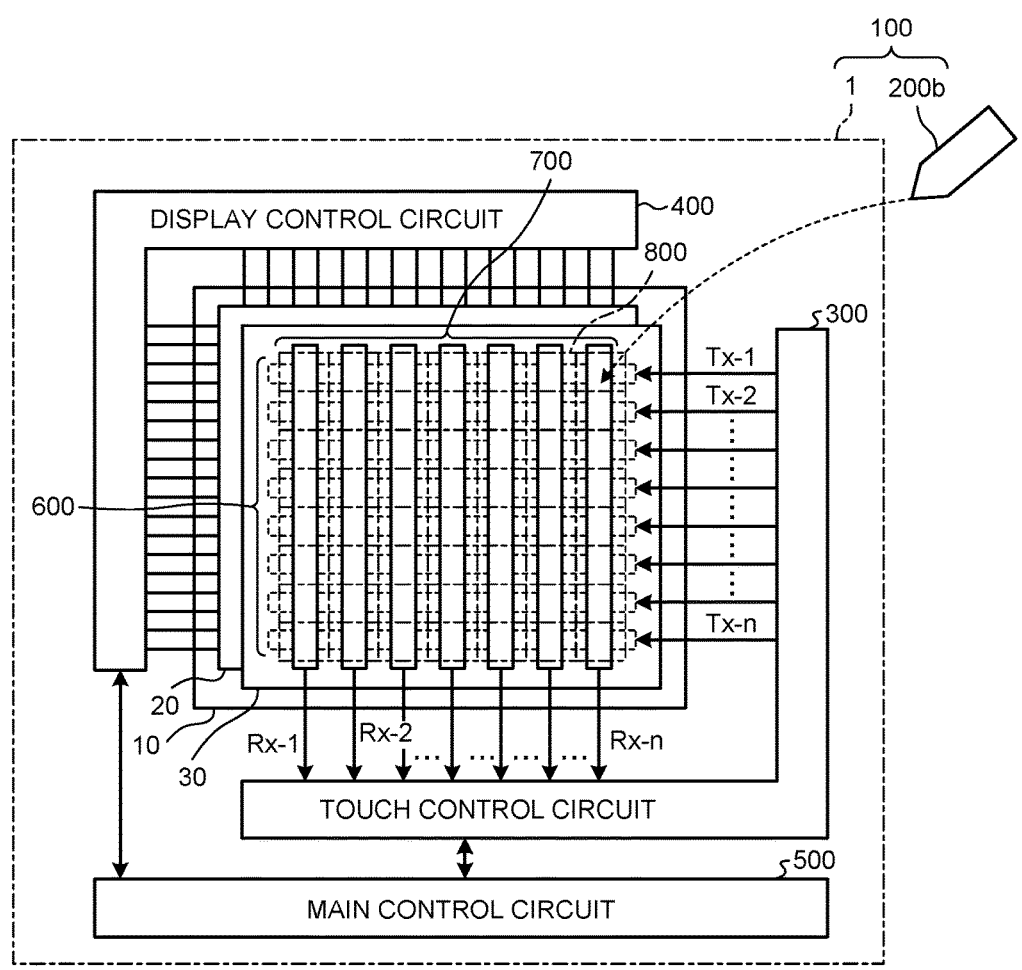
FIG. 11 is a diagram of an exemplary schematic configuration of the touch detection system according to the first embodiment.

The following describes a schematic configuration of the touch detection system according to the present embodiment and schematic operations performed by the components. FIG. 11 is a diagram of an exemplary schematic configuration of the touch detection system according to the first embodiment. The following describes an example in which the pointing device 200b illustrated in FIGS. 9C and 10C is used in combination with the touch detection system.

A touch detection system 100 according to the first embodiment includes the display apparatus 1 with a touch detection function illustrated in FIG. 5 and the pointing device 200b used to indicate a position on the touch detecting device 30. In the example illustrated in FIG. 11, a part of the configuration described with reference to FIGS. 5 to 8 is replaced to simplify the explanation. In the example illustrated in FIG. 11, a touch control circuit 300 includes the drive electrode driver 14 and the touch detection circuit 40 illustrated in FIG. 5. A display control circuit 400 includes the gate driver 12 and the source driver 13 illustrated in FIG. 5. A main control circuit 500 includes the control unit 11 illustrated in FIG. 5. In the example illustrated in FIG. 11, transmission electrodes (first electrodes) 600 correspond to the drive electrodes COML illustrated in FIG. 8, and transmission signals Tx correspond to the drive signals Vcom illustrated in FIGS. 5 and 8. Reception electrodes (second electrodes) 700 correspond to the touch detection electrodes TDL illustrated in FIG. 8, and reception signals Rx correspond to the touch detection signals Vdet illustrated in FIGS. 5 and 8. The display device 10 with a touch detection function has a touch detection region 800 divided into a plurality of portions (hereinafter, referred to as "divided portions"). There is a divided portion for every intersection of the transmission electrodes 600 and the reception electrodes 700. In the example illustrated in FIGS. 5 to 8, the display drive signal Vcomd is supplied to the drive electrodes COML to perform a display operation. In the following description with reference to FIG. 11, explanation of the display operation will be omitted.

The touch control circuit 300, the display control circuit 400, and the main control circuit 500 are an example of a "control circuit" according to the present invention.

Figure 12:
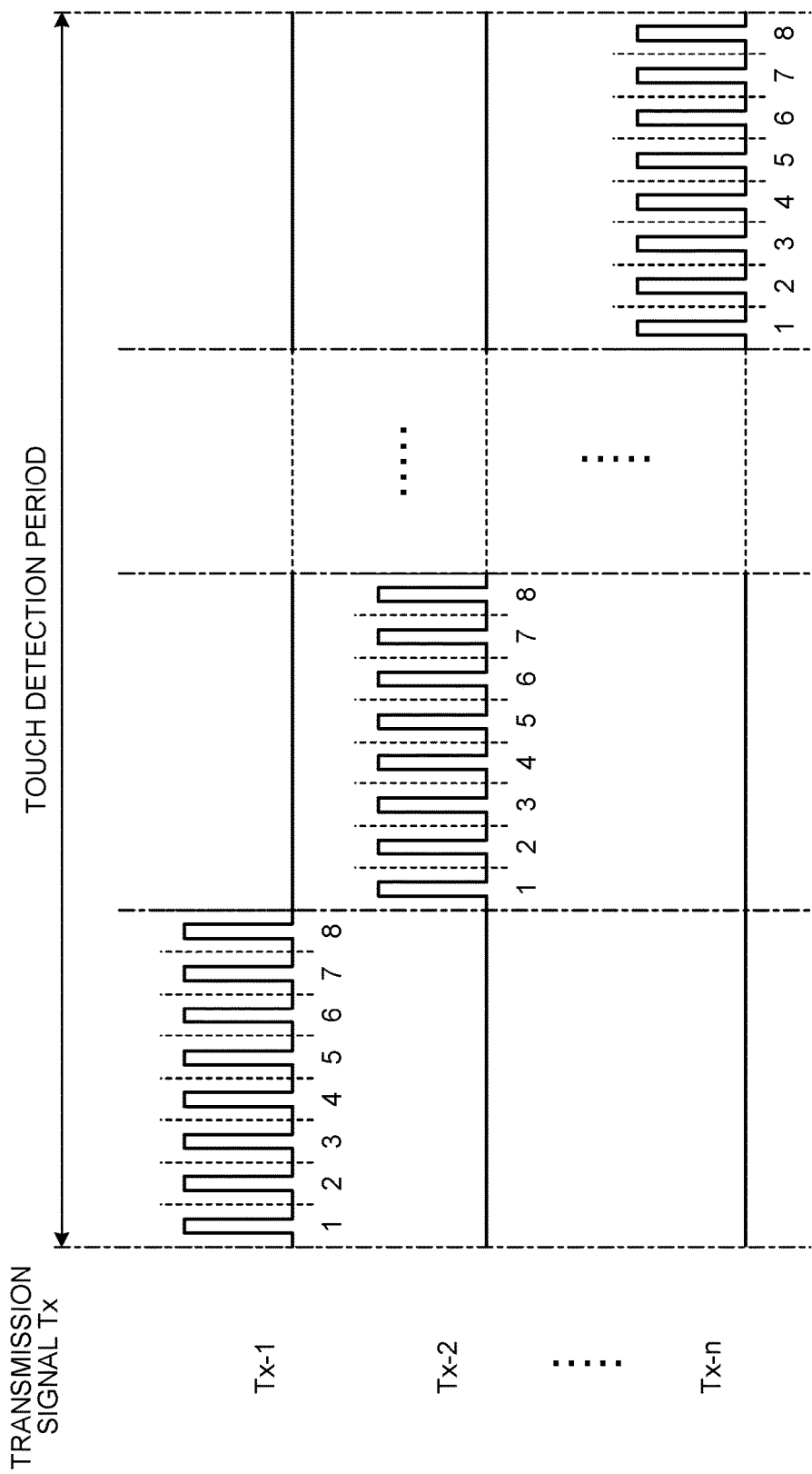
FIG. 12 is a diagram of an example of transmission signals Tx output from a touch control circuit in the touch detection system according to the first embodiment.

As described above, the touch detecting device 30 according to the present embodiment is a mutual-type touch detecting device. The touch detecting device 30 performs a touch detection operation by: sequentially applying the touch detection drive signal Vcomt (transmission signal Tx in this example) to the drive electrodes COML (transmission electrodes 600) in a time-division manner; and receiving the touch detection signal Vdet (reception signal Rx) output from the touch detection electrodes TDL (reception electrodes 700) intersecting with the transmission electrodes 600. FIG. 12 is a diagram of an example of the transmission signals Tx output from the touch control circuit in the touch detection system according to the first embodiment. In the present embodiment, the transmission signals Tx output from the touch control circuit 300 are pulse waveform signals including a plurality of pulses having the same peak value as illustrated in FIG. 12. The transmission signals Tx are transmitted to the respective transmission electrodes 600 in a time-division manner during a touch detection period. While the number of pulses in the transmission signals Tx is eight in the example illustrated in FIG. 12, the number is not limited thereto.

Figure 13:
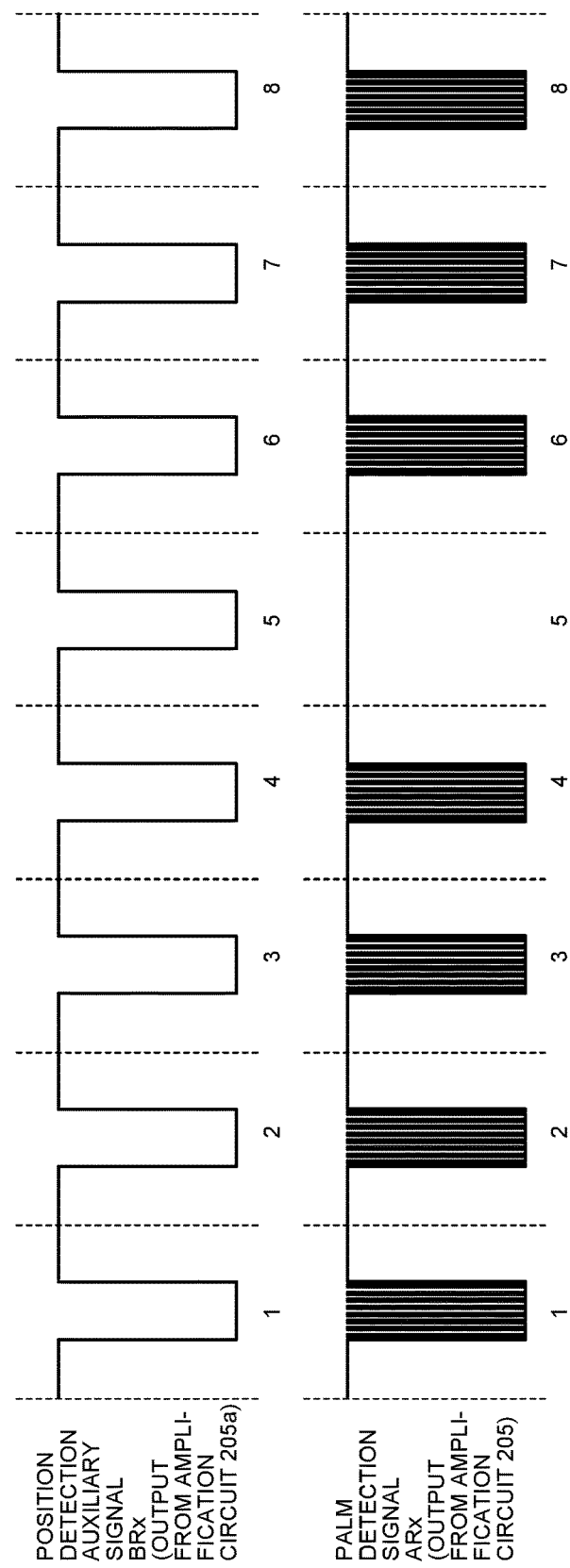
FIG. 13 is a diagram of an example of a position detection auxiliary signal BRx and a palm detection signal ARx.

FIG. 13 is a diagram of an example of the position detection auxiliary signal BRx and the palm detection signal ARx. In the example illustrated in FIG. 13, the position detection auxiliary signal BRx corresponds to the inverted and amplified signal of the transmission signal Tx illustrated in FIG. 12. The palm detection signal ARx is a signal to which pulses having a period shorter than that of the position detection auxiliary signal BRx are added. The palm detection signal ARx is generated corresponding to the pulses other than the pulse "5" of the transmission signal Tx illustrated in FIG. 12. The signal pattern of the palm detection signal ARx is not limited thereto. In the pointing device 200a, the signal pattern of the position detection auxiliary signal BRx is not limited to that described above and simply needs to be different from the signal pattern of the palm detection signal ARx.

When the hand of the user holding the pointing device 200, 200a, or 200b is in proximity to or in contact with the display device 10 with a touch detection function, the palm detection signal ARx output from the handle output unit 202 is transmitted to the touch detecting device 30 via the hand of the user at the proximity or contact position. By detecting the palm detection signal ARx, the touch detecting device 30 can determine that the hand of the user holding the pointing device 200, 200a, or 200b is in proximity to or in contact with the display device 10 with a touch detection function.

Figure 14:
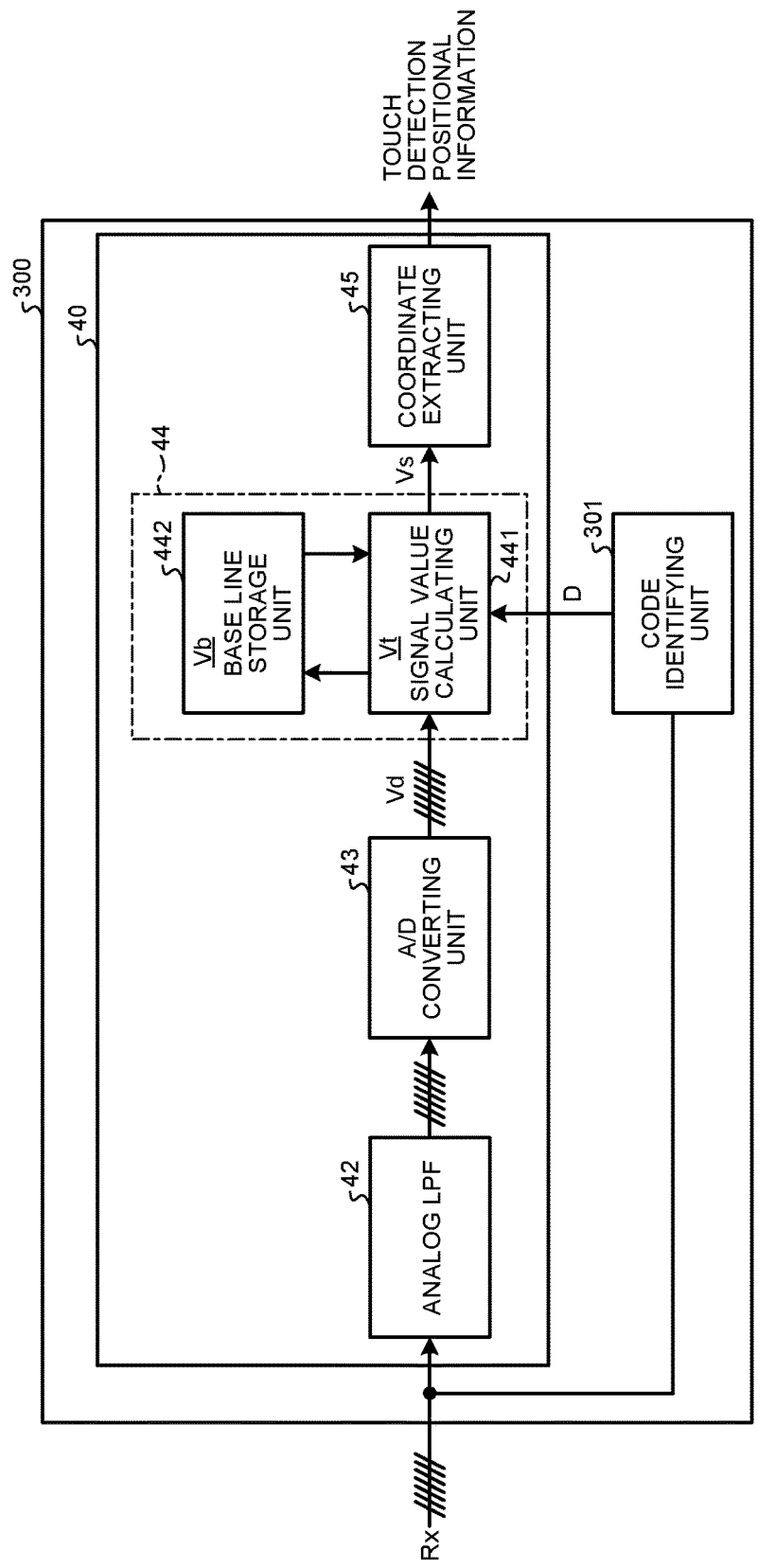
FIG. 14 is a diagram of an exemplary configuration of the touch control circuit in the touch detection system according to the first embodiment.

FIG. 14 is a diagram of an exemplary configuration of the touch control circuit in the touch detection system according to the first embodiment. The touch control circuit 300 includes a code identifying unit 301 besides the drive electrode driver 14 and the touch detection circuit (touch detecting unit) 40 illustrated in FIG. 5. In the example illustrated in FIG. 14, neither the drive electrode driver 14 nor the detection timing control unit 46 is illustrated.

The touch detection circuit 40 and the code identifying unit 301 receive the reception signal Rx on which the palm detection signal ARx and the position detection auxiliary signal BRx are superimposed. By superimposing the position detection auxiliary signal BRx on the reception signal Rx, it is possible to increase the accuracy in detection of a touch state created by the pointing device 200b even when the capacitance formed between the tip of the pointing device 200b and the transmission electrode 600 is low. The capacitance corresponds to CT in the basic principle of touch detection illustrated in FIGS. 1A, 1B, 2A, 2B, 3A, 3B, and 4.

The code identifying unit 301 analyzes the reception signal Rx and determines whether the reception signals Rx in all the reception electrodes 700 include the code A in synchronization with application of the transmission signals Tx to the respective transmission electrodes 600. The code identifying unit 301 performs the code identification processing on each divided portion in the touch detection region 800. If the code A is included in the reception signal Rx, the code identifying unit 301 sets code reception data D to "1" and outputs it to the signal processing unit 44 of the touch detection circuit 40. By contrast, if the code A is not included in the reception signal Rx, the code identifying unit 301 sets the code reception data D to "0" and outputs it to the signal processing unit 44 of the touch detection circuit 40.

The A/D converting unit 43 generates detection data Vd for the reception signals Rx in all the reception electrodes 700 in synchronization with application of the transmission signals Tx to the respective transmission electrodes 600. The A/D converting unit 43 performs the generation process on all the transmission electrodes 600, thereby generating the detection data Vd of all the divided portions in the touch detection region 800.

The signal processing unit 44 of the touch detection circuit 40 includes a signal value calculating unit 441 and a base line storage unit 442. The signal value calculating unit 441 receives the detection data Vd of all the divided portions in the touch detection region 800 and the code reception data D output from the code identifying unit 301.

The base line storage unit 442 stores therein the detection data Vd generated by the A/D converting unit 43 in the non-touch state on each divided portion in the touch detection region 800 as base line data Vb. The base line data Vb is appropriately updated by the signal value calculating unit 441.

Based on the detection data Vd acquired from the A/D converting unit 43 and the base line data Vb stored in the base line storage unit 442, the signal value calculating unit 441 calculates differential data Vs, which is a signal component attributed to the touch state and the non-touch state in the touch detection region 800 included in the detection data Vd. Specifically, the signal value calculating unit 441 calculates the differential data Vs (=Vd−Vb) based on the detection data Vd acquired from the A/D converting unit 43 and the base line data Vb stored in the base line storage unit 442.

The signal value calculating unit 441 holds a threshold Vt used to determine whether each divided portion in the touch detection region 800 is in the touch state or the non-touch state. The signal value calculating unit 441 compares the differential data Vs calculated for each divided portion in the touch detection region 800 with the threshold Vt. If the differential data Vs is equal to or smaller than the threshold Vt (Vs≤Vt), the signal value calculating unit 441 determines that the divided portion in the touch detection region 800 is in the non-touch state. By contrast, if the differential data Vs exceeds the threshold, the signal value calculating unit 441 determines that the divided portion in the touch detection region 800 is in the touch state.

The signal value calculating unit 441 determines an area in the touch detection region 800 to be a touch-state detected area such that the touch-state detected area includes divided portions that have been determined to be in the touch state. If the touch-state detected area includes a divided portion having a code reception data D of "1", the signal value calculating unit 441 determines the touch-state detected area to be a non-touch-state detected area. In other words, the touch-state detected area including a divided portion having a code reception data D of "1" is excluded from the target of touch coordinate calculation to be performed by the coordinate extracting unit 45 in the subsequent process. The signal value calculating unit 441 determines the remaining touch-state detected area to be a coordinate calculation target area, which is the target of touch coordinate calculation to be performed by the coordinate extracting unit 45 in the subsequent process. The signal value calculating unit 441 outputs information on the coordinate calculation target area and the differential data Vs of the divided portions in the touch detection region 800 included in the coordinate calculation target area to the coordinate extracting unit 45.

If the signal value calculating unit 441 determines that the divided portion in the touch detection region 800 is in the non-touch state, the signal value calculating unit 441 updates the base line data Vb of the divided portion in the touch detection region 800 with the detection data Vd of the divided portion in the touch detection region 800. By appropriately updating the base line data Vb, it is possible to perform touch detection accurately even when the base line data Vd in the non-touch state fluctuates due to a change in the operating environment, for example.

The coordinate extracting unit 45 uses the differential data Vs of the divided portions in the touch detection region 800 included in the coordinate calculation target area output from the signal processing unit 44 to analyze the distribution state of the divided portions in the touch detection region 800 indicating the touch state. The coordinate extracting unit 45 thus determines position coordinates. The method for determining the position coordinates is appropriately selected depending on the operating state and other factors. The coordinate extracting unit 45, for example, may calculate the center of gravity of the touch-state detected area as the position coordinates. Alternatively, the coordinate extracting unit 45 may determine the position coordinates based on the value of the calculated differential data Vs. The coordinate extracting unit 45 may perform tracking processing for associating the position coordinates with previously detected position coordinates as needed. The coordinate extracting unit 45 outputs, to the main control circuit 500, information on whether a touch is made and the position coordinates at which the touch is detected. The information is called the touch detection positional information.

Figure 15:
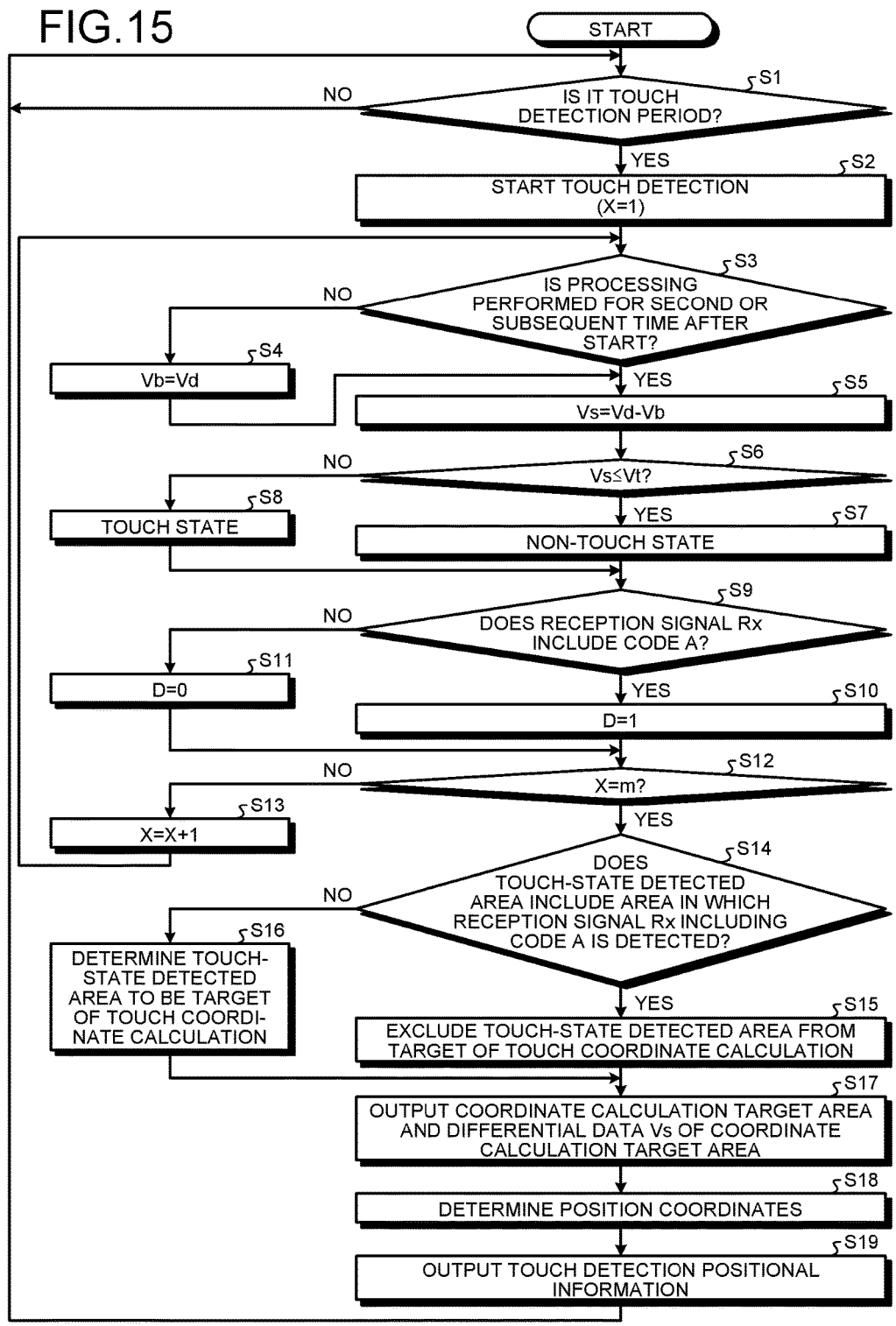
FIG. 15 is a flowchart illustrating an example of a specific flow of processing performed by the touch detection system according to the first embodiment.
Figure 18:
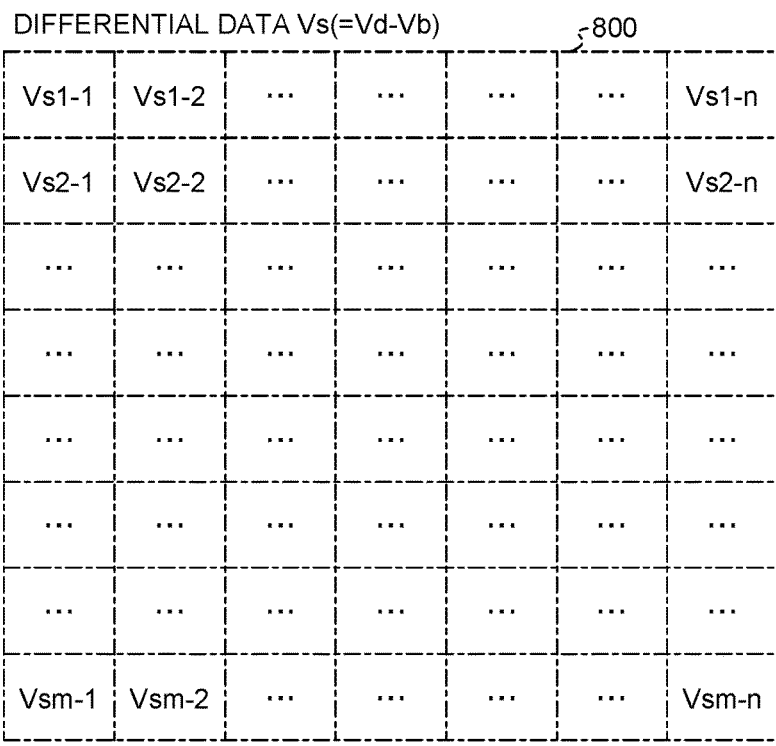
FIG. 18 is an exemplary distribution chart of differential data Vs in the touch detection region.
Figure 19:
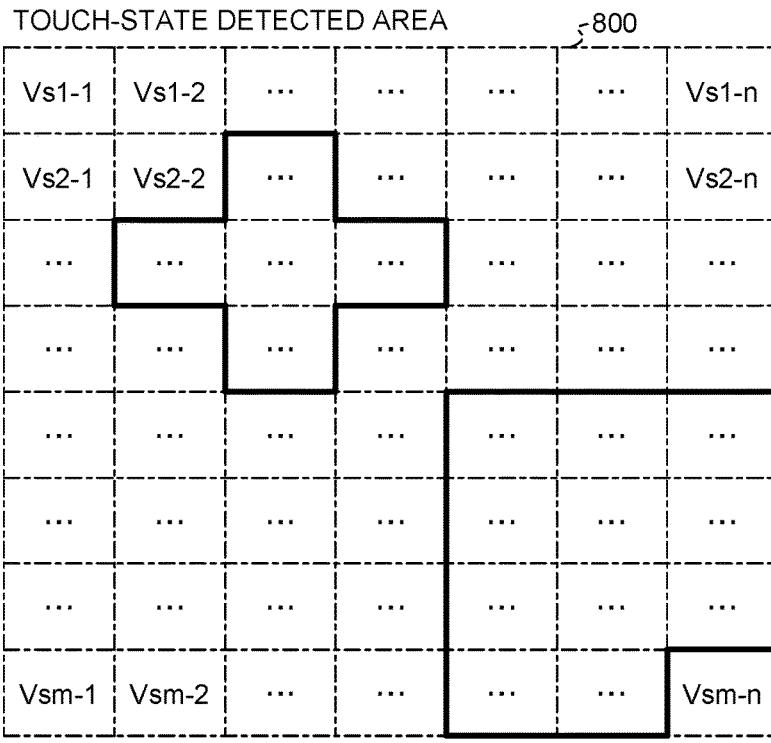
FIG. 19 is an exemplary distribution chart of a touch-state detected area in which the differential data Vs exceeds a threshold in the touch detection region.

The following describes a specific processing flow performed by the touch detection system 100 according to the first embodiment. FIG. 15 is a flowchart illustrating an example of a specific flow of processing performed by the touch detection system according to the first embodiment. FIG. 16 is an exemplary distribution chart of the base line data Vb in the touch detection region. FIG. 17 is an exemplary distribution chart of the detection data Vd in the touch detection region. FIG. 18 is an exemplary distribution chart of the differential data Vs in the touch detection region. FIG. 19 is an exemplary distribution chart of the touch-state detected area in which the differential data Vs exceeds the threshold in the touch detection region. FIG. 20 is an exemplary distribution chart of the code reception data D in the touch detection region. FIG. 21 is an exemplary distribution chart of the coordinate calculation target area in the touch detection region.

When the display apparatus 1 with a touch detection function starts to operate, the touch control circuit 300 determines whether it is a touch detection period for performing touch detection (Step S1). Touch detection is performed in a period when the transmission electrodes 600 do not operate as common electrodes for display. If it is a touch detection period (Yes at Step S1), the touch control circuit 300 sets a counter value X to "1" and starts touch detection (Step S2). If it is not a touch detection period (No at Step S1), the touch control circuit 300 waits until the next touch detection period starts.

In the touch detection period, the drive electrode driver 14 of the touch control circuit 300 outputs the transmission signal Tx illustrated in FIG. 12 to each transmission electrode 600 in a time-division manner. The transmission signal Tx is transmitted to the reception electrode 700 as the reception signal Rx via the capacitance formed at the divided portion in the touch detection region 800. The reception signal Rx is then received by the touch detection circuit 40 and the code identifying unit 301 of the touch control circuit 300.

The analog LPF 42 removes components having a higher frequency than that of the transmission signal Tx from the reception signal Rx received by the touch detection circuit 40, and the A/D converting unit 43 converts the reception signal Rx into a digital signal. The digital signal is then received by the signal processing unit 44 as the detection data Vd.

The signal processing unit 44 determines whether the processing is performed for the second or subsequent time after the start of the display apparatus 1 with a touch detection function (Step S3). If the processing is not performed for the second or subsequent time after the start (No at Step S3), that is, if the processing is performed just after the start, the signal value calculating unit 441 of the signal processing unit 44 stores the detection data Vd received by the signal processing unit 44 in the base line storage unit 442 as the base line data Vb (Step S4). By performing the processing at Step S4, the touch control circuit 300 acquires the base line data Vb of all the divided portions in the touch detection region 800 illustrated in FIG. 16.

If the processing is performed for the second or subsequent time after the start (Yes at Step S3), the signal value calculating unit 441 calculates the differential data Vs (=Vd−Vb) between the detection data Vd in the touch detection region 800 illustrated in FIG. 17 and the base line data Vb stored in the base line storage unit 442 (Step S5). By performing the processing at Step S5, the touch control circuit 300 acquires the differential data Vs of all the divided portions in the touch detection region 800 illustrated in FIG. 18.

The signal value calculating unit 441 compares the calculated differential data Vs with the threshold Vt, thereby determining whether the differential data Vs is equal to or smaller than the threshold Vt (Step S6). If the differential data Vs is equal to or smaller than the threshold Vt (Vs≤Vt) (Yes at Step S6), the signal value calculating unit 441 determines that the divided portion in the touch detection region 800 is in the non-touch state (Step S7). By contrast, if the differential data Vs exceeds the threshold (No at Step S6), the signal value calculating unit 441 determines that the divided portion in the touch detection region 800 is in the touch state (Step S8). By performing the processing at Steps S6 to S8, the touch control circuit 300 acquires the touch-state detected area in which the differential data Vs exceeds the threshold in the touch detection region 800 illustrated in FIG. 19. In the example illustrated in FIG. 19, the touch-state detected area is represented as areas surrounded by the solid lines.

The code identifying unit 301 determines whether the received reception signal Rx includes the code A (Step S9). If the reception signal Rx includes the code A (Yes at Step S9), the code identifying unit 301 sets the code reception data D to "1" and outputs it to the signal value calculating unit 441 (Step S10). By contrast, if the reception signal Rx does not include the code A (No at Step S9), the code identifying unit 301 sets the code reception data D to "0" and outputs it to the signal value calculating unit 441 (Step S11). By performing the processing at Steps S9 to S11, the touch control circuit 300 acquires the code reception data D of all the divided portions in the touch detection region 800 illustrated in FIG. 20. In the example illustrated in FIG. 20, an area in which the code reception data D is set to "1", that is, an area in which the reception signal Rx including the code A is detected is surrounded by the solid line. If the reception signal Rx includes the code A, the signal value calculating unit 441 determines that the hand of the user holding the pointing device 200b is in proximity to or in contact with the divided portion in the touch detection region 800.

The touch control circuit 300 determines whether the counter value X is m (Step S12). If the counter value X is not m (No at Step S12), the touch control circuit 300 increments the counter value X by 1 (Step S13) and performs the processing at Step S3 again. By repeatedly performing the processing from Step S3 to Step S12 until the counter value X reaches m, the touch control circuit 300 acquires the base line data Vb of all the divided portions in the touch detection region 800 illustrated in FIG. 16, the detection data Vd of all the divided portions in the touch detection region 800 illustrated in FIG. 17, the differential data Vs of all the divided portions in the touch detection region 800 illustrated in FIG. 18, the touch-state detected area in which the differential data Vs exceeds the threshold in the touch detection region 800 illustrated in FIG. 19, and the code reception data D of all the divided portions in the touch detection region 800 illustrated in FIG. 20. If the counter value X is m (Yes at Step S12), the touch control circuit 300 performs the processing at Step S14.

The signal value calculating unit 441 determines whether the touch-state detected area illustrated in FIG. 19 includes an area in which the reception signal Rx including the code A is detected, that is, an area in which the code reception data D is set to "1", illustrated in FIG. 20 (Step S14). If the touch-state detected area includes an area in which the reception signal Rx including the code A is detected (Yes at Step S14), the signal value calculating unit 441 excludes the touch-state detected area (area surrounded by the broken line in FIG. 21) from the target of touch coordinate calculation to be performed by the coordinate extracting unit 45 in the subsequent process (Step S15). By contrast, if the touch-state detected area does not include an area in which the reception signal Rx including the code A is detected (No at Step S14), the signal value calculating unit 441 determines the touch-state detected area (area surrounded by the solid line in FIG. 21) to be the target of touch coordinate calculation to be performed by the coordinate extracting unit 45 in the subsequent process (Step S16).

The signal value calculating unit 441 outputs information on the coordinate calculation target area and the differential data Vs of the divided portions in the touch detection region 800 included in the coordinate calculation target area to the coordinate extracting unit 45 (Step S17).

The coordinate extracting unit 45 uses the differential data Vs of the divided portions in the touch detection region 800 included in the coordinate calculation target area to analyze the distribution state of the divided portions in the touch detection region 800 indicating the touch state, thereby determining position coordinates (Step S18). The coordinate extracting unit 45 outputs, to the main control circuit 500, information on whether a touch is detected and the position coordinates at which the touch is detected. The information is called the touch detection positional information (Step S19). The touch control circuit 300 then performs the processing at Step S1 again. Subsequently, the flow described above is repeatedly performed until the display apparatus 1 with a touch detection function stops operating.

By performing the processing described above, the touch control circuit 300 can exclude, from the touch-state detected area illustrated in FIG. 19, the area in which a touch state is detected as a result of the hand of the user holding the pointing device 200b coming closer to or into contact with the touch detection region 800. It is thus possible to reliably extract the detected position of a touch made by the pointing device 200b.

In the example described above, the user performs a touch operation in the touch detection region 800 using the pointing device 200b illustrated in FIG. 9C. Alternatively, the user may perform a touch operation in the touch detection region 800 using the pointing device 200 illustrated in FIG. 9A or the pointing device 200a illustrated in FIG. 9B. Also in this case, by performing the processing described above, the touch control circuit 300 can exclude, from the touch-state detected area illustrated in FIG. 19, the area in which a touch state is detected as a result of the hand of the user holding the pointing device 200 and 200a coming closer to or into contact with the touch detection region 800. It is thus possible to reliably extract the detected position of a touch made by the pointing device 200 and 200a. Specifically, the pointing devices 200, 200a, and 200b each include, at the body thereof, the handle output unit 202 with which the hand of the user holding the pointing devices 200, 200a, and 200b, respectively, comes into contact. The handle output unit 202 outputs the palm detection signal ARx different from the signal detected when the user performs a touch operation with the pointing device 200, 200a, or 200b. By detecting the palm detection signal ARx received by each divided portion in the touch detection region 800 via the hand of the user, it is possible to exclude, from the touch-state detected area illustrated in FIG. 19, the area in which a touch state is detected as a result of the hand of the user holding the pointing device 200, 200a, and 200b coming closer to or into contact with the touch detection region 800.

In a case where the user performs a touch operation in the touch detection region 800 using the pointing device 200a illustrated in FIG. 9B, the pen-tip output unit 206 outputs the position detection auxiliary signal BRx including the code B different from the code A. As a result, the position detection auxiliary signal BRx transmitted from the pointing device 200a to each divided portion of the touch detection region 800 is superimposed on the reception signal Rx. In this case, the code identifying unit 301 identifies the code A and the code B. The code identifying unit 301 outputs ternary code reception data D including data indicating that the pointing device 200a is in proximity to or in contact with the touch detection region 800 and data indicating that the hand of the user holding the pointing device 200a is in proximity to or in contact with the touch detection region 800. The signal value calculating unit 441 may use the code reception data D to distinguish a first touch-state detected area in which the pointing device 200a is in proximity to or in contact with the touch detection region 800 from a second touch-state detected area in which the hand of the user holding the pointing device 200a is in proximity to or in contact with the touch detection region 800. This configuration can distinguish a touch operation performed by the pointing device 200a from a touch operation performed by other objects (e.g., a pointing device other than the pointing device 200a).

In a case where the user performs a touch operation in the touch detection region 800 using the pointing device 200b illustrated in FIG. 9C, the pen-tip output unit 206 outputs the position detection auxiliary signal BRx obtained by inverting and amplifying the transmission signal Tx, and the handle output unit 202 outputs the palm detection signal ARx obtained by superimposing the signal including the code A on the inverted signal of the transmission signal Tx. The position detection auxiliary signal BRx is received by each divided portion in which the pointing device 200b is in proximity to or in contact with the touch detection region 800 and by each divided portion in which the hand of the user holding the pointing device 200b is in proximity to or in contact with the touch detection region 800. The position detection auxiliary signal BRx is then superimposed on the reception signal Rx. This configuration can increase the accuracy in detection of both the touch state created by the pointing device 200b and the touch state created by the hand holding the pointing device 200b.

In the example described above, the touch detection system 100 includes the display apparatus 1 with a touch detection function. Also in a case where the touch detection system does not include a display device, such as the liquid-crystal display device 20, and includes only the touch detecting device 30 having no display function singly, the processing described above may be performed. By performing the processing, it is possible to reject a touch operation created by the hand of the user holding the pointing device 200, 200a, or 200b.

In other words, the touch detection system 100 according to the present embodiment enables a touch operation performed by the hand of the user not holding the pointing device 200, 200a, or 200b and by an object other than the pointing device 200, 200a, or 200b to effectively function. In addition, the touch detection system 100 can reject only a touch operation performed by the hand of the user holding the pointing device 200, 200a, or 200b. It is thus possible to provide a highly accurate palm rejection function.

As described above, the pointing devices 200, 200a, and 200b according to the first embodiment each include, at the body thereof, the handle output unit 202 with which the hand of the user holding the pointing devices 200, 200a, and 200b, respectively, comes into contact. The handle output unit 202 outputs the palm detection signal ARx including the code A different from the signal detected when the user performs a touch operation with the pointing device 200, 200a, or 200b. By detecting the palm detection signal ARx received by each divided portion in the touch detection region 800 via the hand of the user, it is possible to exclude, from the touch-state detected area in which a touch state is detected in the touch detection region 800, the area in which a touch state is detected as a result of the hand of the user holding the pointing device 200, 200a, and 200b coming closer to or into contact with the touch detection region 800.

The pointing device 200a according to the first embodiment outputs, from the pen-tip output unit 206, the position detection auxiliary signal BRx including the code B different from the code A. As a result, the position detection auxiliary signal BRx transmitted from the pointing device 200a is received by each divided portion in the touch detection region 800 and is superimposed on the reception signal Rx. This configuration can distinguish a touch operation performed by the pointing device 200a from a touch operation performed by other objects.

The pointing device 200b according to the first embodiment outputs, from the pen-tip output unit 206, the position detection auxiliary signal BRx obtained by inverting and amplifying the transmission signal Tx. The pointing device 200b also outputs the palm detection signal ARx obtained by superimposing the signal including the code A on the inverted signal of the transmission signal Tx. As a result, the position detection auxiliary signal BRx received by each divided portion in the touch detection region 800 is superimposed on the reception signal Rx. This configuration can increase the accuracy in detection of both the touch state created by the pointing device 200b and the touch state created by the hand holding the pointing device 200b.

The touch detection system 100 according to the first embodiment detects the palm detection signal ARx received by each divided portion in the touch detection region 800 via a human body from the pointing device 200, 200a, or 200b. The touch detection system 100 excludes the touch-state detected area in which a touch state is detected in the touch detection region 800 and including an area in which the palm detection signal ARx is detected. This configuration can accurately extract the touch-state detected area in which a touch state created by the pointing device 200, 200a, or 200b is detected.

The touch detection system 100 according to the first embodiment detects the position detection auxiliary signal BRx transmitted from the pointing device 200a. The touch detection system 100 determines an area including the divided portions in the touch detection region 800 that receive the position detection auxiliary signal BRx to be an area in which a touch operation is performed by the pointing device 200a. This configuration can distinguish the touch-state detected area in which a touch state created by the pointing device 200a is detected from the touch-state detected area in which a touch state created by other objects is detected.

The position detection auxiliary signal BRx transmitted from the pointing device 200b according to the first embodiment is received by each divided portion in the touch detection region 800 and is superimposed on the reception signal Rx. This configuration can increase the accuracy in detection of both the touch-state detected area in which a touch state created by the pointing device 200b is detected and the touch-state detected area in which a touch state created by the hand holding the pointing device 200b is detected.

The present embodiment can provide the pointing devices 200, 200a, and 200b and the touch detection system 100 that can exclude a touch operation performed by the hand holding the pointing device 200, 200a, or 200b simply by the touch operation.

Second Embodiment

Figure 22:
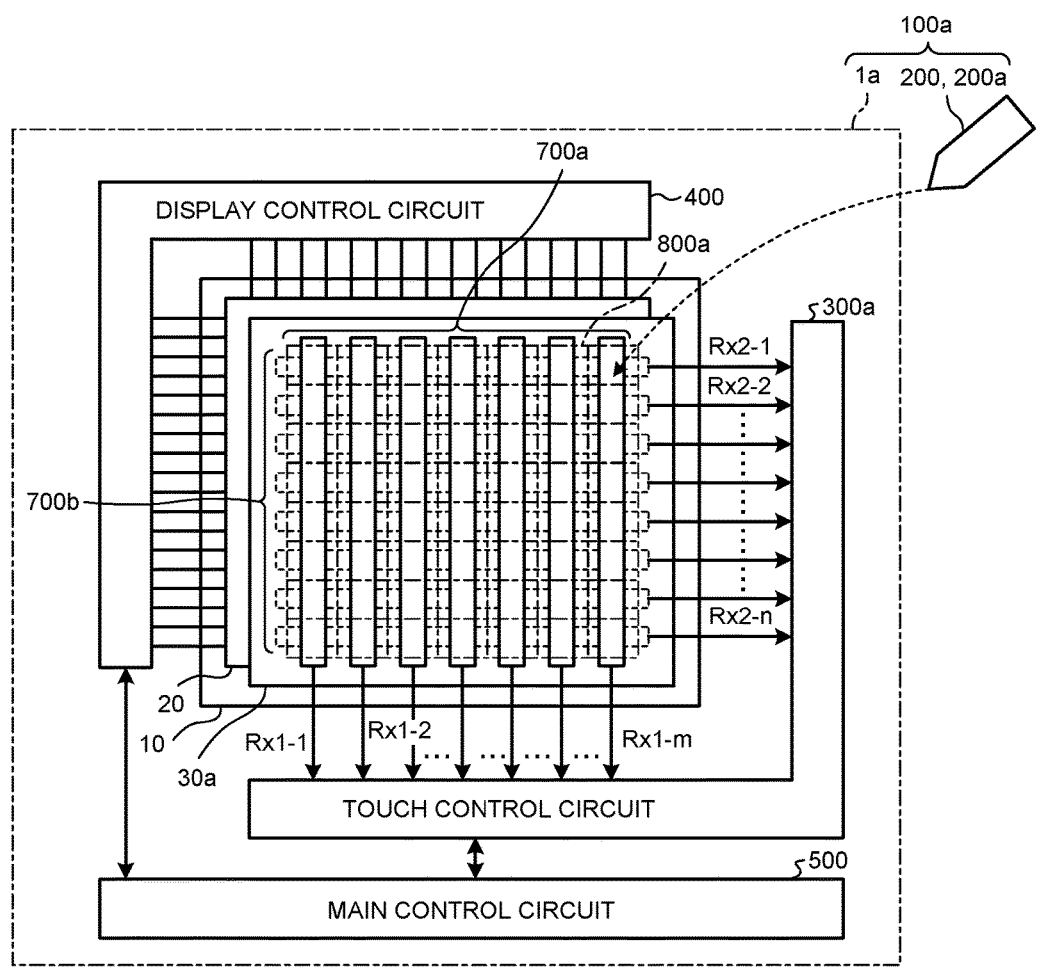
FIG. 22 is a diagram of an exemplary schematic configuration of the touch detection system according to a second embodiment.

FIG. 22 is a diagram of an exemplary schematic configuration of the touch detection system according to a second embodiment. The present embodiment uses the pointing device 200 or 200a described in the first embodiment. A touch detection system 100a according to the second embodiment includes a display apparatus 1a with a touch detection function and the pointing device 200 or 200a. Components identical with those described in the embodiment above are denoted by the same reference numerals and symbols, and overlapping explanation thereof will be omitted.

While the touch detecting device 30 according to the first embodiment is a mutual-type touch detecting device that detects a touch position based on a change in the capacitance at the intersections between the transmission electrodes 600 and the reception electrodes 700, the present embodiment uses a touch detecting device 30a illustrated in FIG. 22. The touch detecting device 30a is a self-type touch detecting device that detects a touch position based on a change in the capacitance between reception electrodes (first electrodes) 700a and reception electrodes (second electrodes) 700b intersecting with the reception electrodes 700a, and the pointing device 200 or 200a serving as a detection target. The self-detection technology employed by the self-type touch detecting device electrically drives detection electrodes and detects the degree of fluctuation in the detection electrodes, thereby determining whether a touch is made. In a case where the detection electrodes are driven by capacitive coupling, for example, additional capacitance caused by a finger or a stylus (pointing device) reduces the amplitude. By detecting the degree of the change in the amplitude, it is possible to determine whether a touch is made. The self-detection technology employed by the self-type touch detecting device is not limited to the technology described above and may be various types of technologies.

In the touch detection system 100a according to the present embodiment, the touch detecting device 30a includes a plurality of reception electrodes 700a and a plurality of reception electrodes 700b. The reception electrodes 700a are provided side by side in a manner extending in one direction, and the reception electrodes 700b are provided side by side in a manner extending in a direction intersecting with the reception electrodes 700a. The display device 10 with a touch detection function has a touch detection region 800a divided into a plurality of portions (hereinafter, also referred to as "divided portions"). There is a divided portion for every intersection of the reception electrodes 700a and the reception electrodes 700b.

A touch control circuit 300a receives both reception signals Rx1 from the reception electrodes 700a and reception signals Rx2 from the reception electrodes 700b.

In the touch detection system 100a including the self-type touch detecting device 30a, the pointing devices 200 and 200a each include, at the body thereof, the handle output unit 202 with which the hand of the user holding the pointing devices 200 and 200a, respectively, comes into contact. The handle output unit 202 outputs the palm detection signal ARx different from the signal detected in a touch operation with the pointing device 200 or 200a. By detecting the palm detection signal ARx received by each divided portion in the touch detection region 800a via the hand of the user, it is possible to exclude, from the touch-state detected area illustrated in FIG. 19, the area in which a touch state is detected as a result of the hand of the user holding the pointing device 200 or 200a coming closer to or into contact with the touch detection region 800a.

As described above, in the touch detection system according to the second embodiment, the touch detecting device 30a is a self-type touch detecting device. Also in this case, the pointing devices 200 and 200a each include the handle output unit 202 at the body thereof. The handle output unit 202 outputs the palm detection signal ARx different from the signal detected in a touch operation with the pointing device 200 or 200a. By detecting the palm detection signal ARx received by each divided portion in the touch detection region 800a via the hand of the user, it is possible to exclude, from the touch-state detected area in which a touch state is detected in the touch detection region 800a, the area in which a touch state is detected as a result of the hand of the user holding the pointing device 200 or 200a coming closer to or into contact with the touch detection region 800a.

Similarly to the first embodiment, the present embodiment can provide the touch detection system 100a that can exclude a touch operation performed by the hand holding the pointing device 200 or 200a simply by the touch operation.

While the embodiments have been explained, the contents described above are not intended to limit the present invention. Components according to the present invention include components easily conceivable by those skilled in the art, components substantially identical therewith, and what is called equivalents. The components described above may be appropriately combined, and various omissions, substitutions, and changes of the components may be made without departing from the spirit of the invention.

What is claimed is:

1. A pointing device used to indicate a position on a touch detecting device, the pointing device comprising:
   a handle output circuit provided in a user contactable area of a body of the pointing device; and
   a first signal generating circuit that generates a first pulse signal including a first code that is predetermined;
   a first signal amplifier that amplifies the first pulse signal to generate a palm detection signal,
   wherein the handle output circuit is configured to output the palm detection signal, and
      wherein the palm detection signal is detectable by the touch detecting device after being output by the handle output circuit and transmitted through a hand of the user, and the palm detection signal is different from a signal output to the touch detecting device from a tip of the pointing device.

2. The pointing device according to claim 1, further comprising:
   a second output unit pen-tip output circuit provided to the tip of the pointing device directed to the touch detecting device to indicate the position on the touch detecting device; and
   a second signal generating circuit that generates a second pulse signal including a second code that is predetermined and different from the first code; and
   a second signal amplifier that amplifies the second pulse to generate a position detection auxiliary signal,
   wherein the pen-tip output circuit outputs the position detection auxiliary signal generated by the second signal amplifier,
   wherein the position detection auxiliary signal, which includes the second code and is detected in a touch operation with the tip of the pointing device, is different from the palm detection signal.

3. The pointing device according to claim 1, further comprising:
   a pen-tip output circuit provided to the tip of the pointing device directed to the touch detecting device to indicate the position on the touch detecting device;
   a detecting circuit that detects a change of a transmission signal transmitted from the touch detecting device and outputs as a detection transmission signal; and
   an inversion circuit that inverts the detection transmission signal; and
   a second amplifying circuit that amplifies inverted detection transmission signal to generate a position detection auxiliary signal and that outputs to the pen-tip output circuit and the first signal generating circuit,
   the first signal generating circuit generates the first pulse signal including the inverted detection transmission signal and the first pulse,
   wherein the first signal amplifier amplifies the first pulse generated by the first signal generating circuit to generate the palm detection signal,
   wherein the handle output circuit output the palm detection signal generated by the first signal amplifier,
   wherein the pen-tip output circuit outputs the position detection auxiliary signal generated by the second signal amplifier,
   wherein the position detection auxiliary signal, which includes the second code and is detected in a touch operation with the tip of the pointing device, is different from the palm detection signal.

4. The pointing device according to claim 2, wherein an insulating member is interposed between at least the handle output circuit and the pen-tip output circuit.

5. The pointing device according to claim 3, wherein an insulating member is interposed between at least the handle output circuit and the pen-tip output circuit.

6. A touch detection system comprising:
   the pointing device according to claim 1;
   a touch detecting device including a plurality of first electrodes provided side by side in a manner extending in one direction and a plurality of second electrodes provided side by side in a manner extending in a direction intersecting with the first electrodes, the touch detecting device forming capacitance between the first electrodes and the second electrodes;
   a code identifying circuit that identifies the first code included in a detection signal detected at each of intersections between the first electrodes and the second electrodes; and
   a touch detecting circuit that detects a touch state indicating that the pointing device or the hand of the user is in proximity to or in contact with the touch detecting device based on the detection signal and calculates a coordinate position indicated by the pointing device based on the touch state at each of the intersections and based on output from the code identifying circuit.

7. The touch detection system according to claim 6, wherein the touch detecting circuit determines an area in which the intersections at which the touch state is detected are adjacent to each other to be a touch-state detected area and determines that the hand of the user is in proximity to or in contact with a touch-state detected area including an intersection at which the first code is identified.

8. The touch detection system according to claim 7, wherein the touch detecting circuit excludes, from the intersections at which the touch state is detected, the intersection included in the touch-state detected area to or with which the hand of the user is determined to be in proximity or in contact, and calculates the coordinate position.

9. A touch detection system comprising:
   the pointing device according to claim 2;
   a touch detecting device including a plurality of first electrodes provided side by side in a manner extending in one direction and a plurality of second electrodes provided side by side in a manner extending in a direction intersecting with the first electrodes, the touch detecting device forming capacitance between the first electrodes and the second electrodes;
   a code identifying circuit that identifies the first code and the second code included in a detection signal detected at each of intersections between the first electrodes and the second electrodes; and
   a touch detecting circuit that detects a touch state indicating that the pointing device or the hand of the user is in proximity to or in contact with the touch detecting device based on the detection signal and calculates a coordinate position indicated by the pointing device based on the touch state at each of the intersections and based on output from the code identifying circuit.

10. The touch detection system according to claim 9, wherein the touch detecting circuit determines an area in which the intersections at which the touch state is detected are adjacent to each other to be a touch-state detected area and determines that the hand of the user is in proximity to or in contact with a touch-state detected area including an intersection at which the first code is identified.

11. The touch detection system according to claim 10, wherein the touch detecting circuit determines that the pointing device is in proximity to or in contact with a touch-state detected area including an intersection at which the second code is identified.

12. The touch detection system according to claim 10, wherein the touch detecting circuit excludes, from the intersections at which the touch state is detected, the intersection included in the touch-state detected area to or with which the hand of the user is determined to be in proximity or in contact, and calculates the coordinate position.

13. A touch detection system comprising:
the pointing device according to claim 3;
a touch detecting device including a plurality of transmission electrodes provided side by side in a manner extending in one direction and a plurality of reception electrodes provided side by side in a manner extending in a direction intersecting with the transmission electrodes, the touch detecting device forming capacitance between the transmission electrodes and the reception electrodes; and
a control circuit that outputs the transmission signal to the transmission electrodes and detects a position of the pointing device on at least the touch detecting device based on a reception signal from the reception electrodes, wherein
the control circuit includes:
a code identifying circuit that identifies the first code included in a detection signal detected at each of intersections between the transmission electrodes and the reception electrodes; and
a touch detecting circuit that detects a touch state indicating that the pointing device or the hand of the user holding the pointing device is in proximity to or in contact with the touch detecting device based on the detection signal and calculates a coordinate position indicated by the pointing device based on the touch state at each of the intersections and based on output from the code identifying circuit.

14. The touch detection system according to claim 13, wherein the touch detecting circuit determines an area in which the intersections at which the touch state is detected are adjacent to each other to be a touch-state detected area and determines that the hand of the user is in proximity to or in contact with a touch-state detected area including an intersection at which the first code is identified.

15. The touch detection system according to claim 14, wherein the touch detecting circuit excludes, from the intersections at which the touch state is detected, the intersection included in the touch-state detected area to or with which the hand of the user is determined to be in proximity or in contact, and calculates the coordinate position.

* * * * *